(12) United States Patent
Oh et al.

(10) Patent No.: US 9,058,547 B2
(45) Date of Patent: Jun. 16, 2015

(54) METAL PAYMENT CARD AND METHOD OF MANUFACTURING THE SAME

(71) Applicant: Hyundai Card Co., Ltd., Seoul (KR)

(72) Inventors: Joon Sik Oh, Seoul (KR); Won Seok Choi, Seoul (KR)

(73) Assignee: Hyundai Card Co., Ltd., Seoul (KR)

( * ) Notice: Subject to any disclaimer, the term of this patent is extended or adjusted under 35 U.S.C. 154(b) by 0 days.

(21) Appl. No.: 13/778,647

(22) Filed: Feb. 27, 2013

(65) Prior Publication Data

US 2013/0168454 A1  Jul. 4, 2013

Related U.S. Application Data

(63) Continuation-in-part of application No. PCT/KR2011/006398, filed on Aug. 30, 2011.

(30) Foreign Application Priority Data

Sep. 1, 2010 (KR) ........................ 10-2010-0085477

(51) Int. Cl.
| | |
|---|---|
| *G06K 19/00* | (2006.01) |
| *G06K 19/02* | (2006.01) |
| *B23P 19/04* | (2006.01) |
| *G06K 19/077* | (2006.01) |
| *B44C 1/22* | (2006.01) |
| *B44C 1/24* | (2006.01) |

(Continued)

(52) U.S. Cl.
CPC ........... *G06K 19/02* (2013.01); *Y10T 29/49016* (2015.01); *Y10T 29/49002* (2015.01); *B42D 2033/10* (2013.01); *B42D 2033/24* (2013.01); *B23P 19/04* (2013.01); *G06K 19/022* (2013.01); *G06K 19/07749* (2013.01); *G06K 19/07771* (2013.01); *B44C 1/225* (2013.01); *B44C 1/24* (2013.01); *B42D 15/022* (2013.01); *B42D 2033/46* (2013.01); *G07F 7/00* (2013.01); *G07F 7/0833* (2013.01); *B42D 25/41* (2014.10); *B42D 25/43* (2014.10); *B42D 25/00* (2014.10); *B42D 25/455* (2014.10); *B42D 25/47* (2014.10)

(58) Field of Classification Search
USPC ................................................ 235/487, 492
See application file for complete search history.

(56) References Cited

U.S. PATENT DOCUMENTS

| | | |
|---|---|---|
| 5,412,199 A | 5/1995 | Finkelstein et al. |
| 5,434,405 A | 7/1995 | Finkelstein et al. |

(Continued)

FOREIGN PATENT DOCUMENTS

| | | |
|---|---|---|
| CN | 1151057 A | 6/1997 |
| CN | 1188450 A | 7/1998 |

(Continued)

OTHER PUBLICATIONS

International Search Report for International Application No. PCT/KR2011/006398, dated Apr. 4, 2012, 4 pages (English Translation).

(Continued)

*Primary Examiner* — Matthew Mikels
(74) *Attorney, Agent, or Firm* — Nixon Peabody LLP

(57) ABSTRACT

Provided are a metal payment card and a method of manufacturing the same. The metal payment card of the present disclosure has a main body made from at least one of a liquid metal alloy, aluminum alloy and copper alloy. The main body has a tangible pattern region.

22 Claims, 35 Drawing Sheets

(51) Int. Cl.
*B42D 15/02* (2006.01)
*G07F 7/00* (2006.01)
*G07F 7/08* (2006.01)
*B42D 25/41* (2014.01)
*B42D 25/43* (2014.01)
*B42D 25/00* (2014.01)
*B42D 25/455* (2014.01)
*B42D 25/47* (2014.01)

(56) References Cited

U.S. PATENT DOCUMENTS

| | | |
|---|---|---|
| 5,548,485 A | 8/1996 | Bethurum et al. |
| 5,608,203 A | 3/1997 | Finkelstein et al. |
| 5,856,661 A | 1/1999 | Finkelstein et al. |
| 6,176,430 B1 | 1/2001 | Finkelstein et al. |
| 6,769,618 B1 | 8/2004 | Finkelstein |
| 6,817,532 B2 | 11/2004 | Finkelstein |
| 6,902,116 B2 | 6/2005 | Finkelstein |
| 6,942,156 B2 | 9/2005 | Ohta et al. |
| 7,088,304 B2 | 8/2006 | Endo et al. |
| 8,257,840 B2 | 9/2012 | Li et al. |
| 8,317,231 B2 | 11/2012 | Heim et al. |
| 2007/0166518 A1 | 7/2007 | Brehm |
| 2008/0108181 A1* | 5/2008 | Chan et al. ............ 438/119 |
| 2008/0251587 A1* | 10/2008 | Martinent et al. ............ 235/492 |
| 2009/0159712 A1* | 6/2009 | Mullen et al. ............ 235/493 |

FOREIGN PATENT DOCUMENTS

| | | |
|---|---|---|
| CN | 1396869 A | 2/2003 |
| CN | 1871743 A | 11/2006 |
| CN | 1929995 A | 3/2007 |
| CN | 101391557 A | 3/2009 |
| CN | 101557944 A | 10/2009 |
| CN | 101730464 A | 6/2010 |
| JP | 07-21951 | 3/1995 |
| JP | 09-183286 | 7/1997 |
| JP | 2002-319008 A | 10/2002 |
| KR | 10-0505849 | 7/2005 |
| KR | 10-2006-0021797 | 3/2006 |
| KR | 20-2009-0012343 | 12/2009 |
| KR | 10-2010-0066148 | 6/2010 |
| WO | WO 96/35586 A1 | 11/1996 |
| WO | WO 2008/144336 A1 | 11/2008 |

OTHER PUBLICATIONS

Written Opinion for International Application No. PCT/KR2011/006398, dated Apr. 4, 2012, 12 pages (English Translation).
Office Action in related Chinese Application No. 201180042297.2, dated Jul. 24, 2014 (13 pages).

* cited by examiner

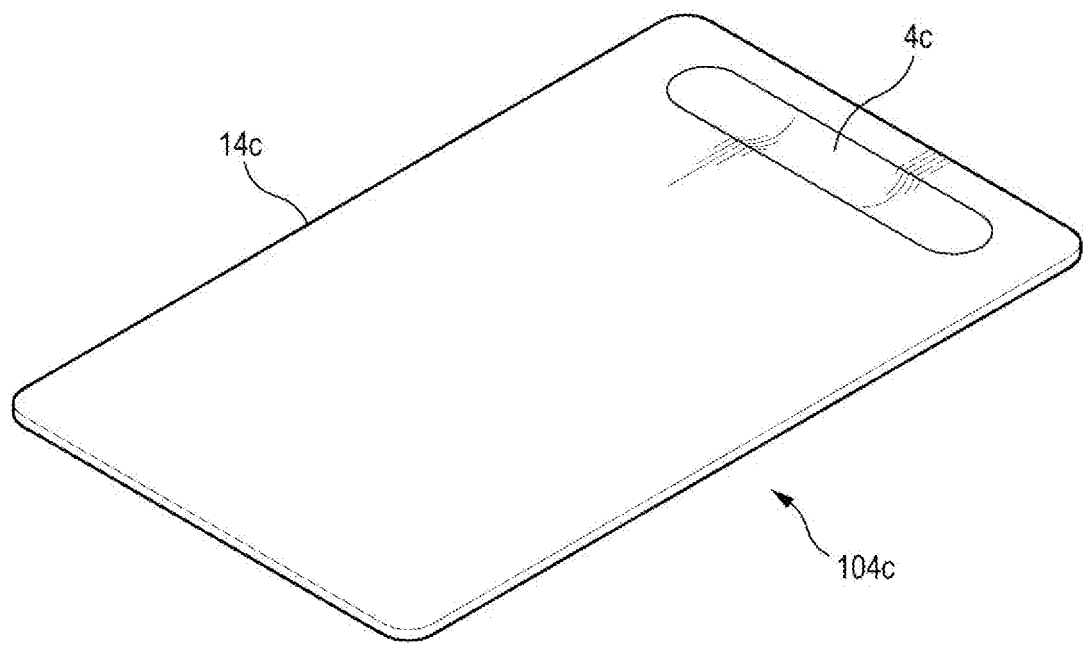

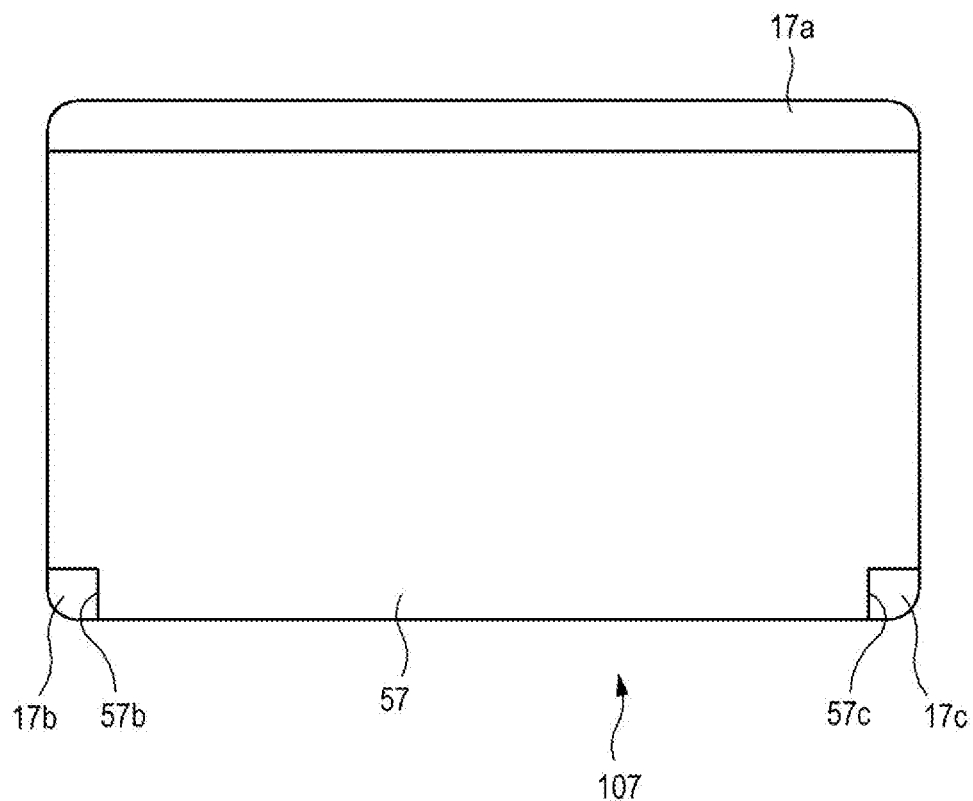

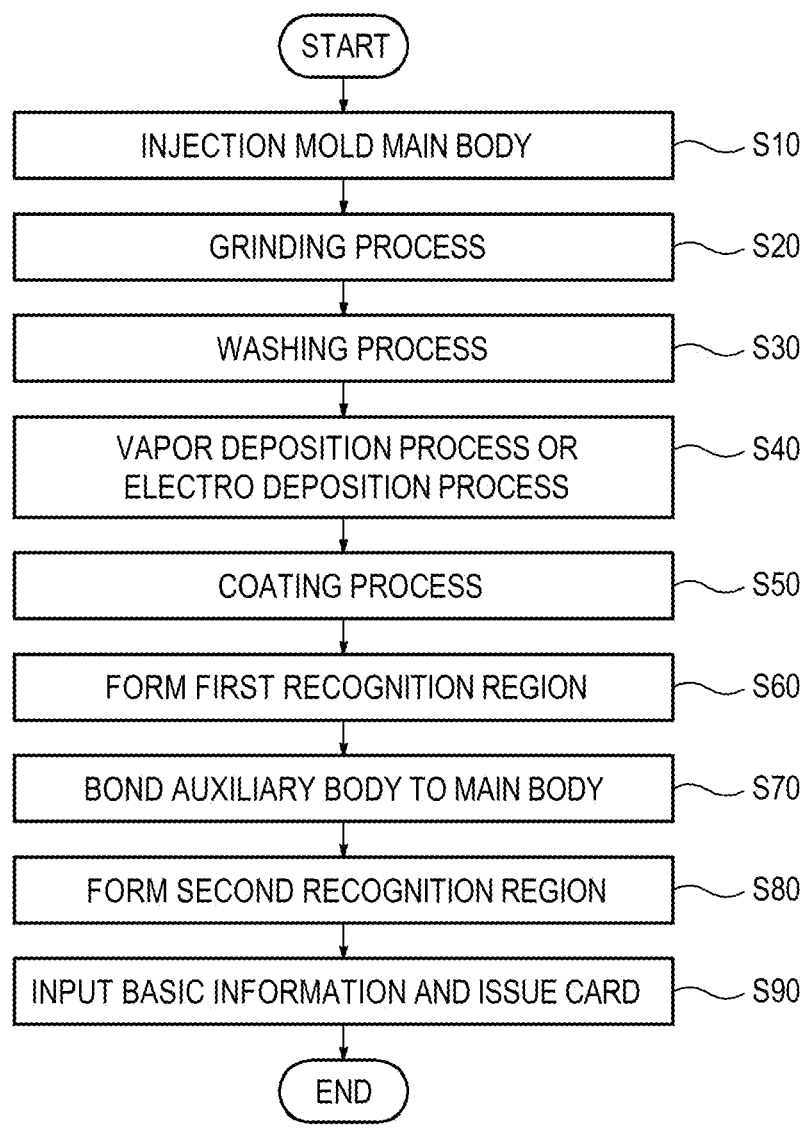

METAL PAYMENT CARD AND METHOD OF MANUFACTURING THE SAME

CROSS-REFERENCE TO RELATED APPLICATIONS

This application is a continuation-in-part of PCT Application No. PCT/KR2011/006398, filed Aug. 30, 2011, which claims the benefit of Korean Patent Application No. 10-2010-0085477, filed Sep. 1, 2010. The contents of the forementioned applications are hereby incorporated by reference in their entirety.

TECHNICAL FIELD

The present disclosure relates to a metal payment card made from metal and a method of manufacturing such a payment card.

BACKGROUND

A payment card, such as a credit card, a check card, a transportation card, a membership card, a point card, etc., has been naturally made for use as payment means for convenient price payment and has been widely used. Such a payment card is typically made from a plastic material. Disadvantageously, due to its plastic characteristics, it is vulnerable to damage under the influence of the external environment and has a poor durability.

Recently, customers showed various needs with regard to the card design in addition to the basic functions of the payment card. Further, the card design has been emphasized as an important factor for differentiating against competitors.

To meet such a trend, attempts have been made to make a payment card comprising a metallic material. Further, new designs have been introduced such that a payment card can exhibit elegant impression of color or texture. However, general metallic materials are excessively heavy to be used for a card and do not provide appropriate portability. Further, general metallic materials are insufficient to implement a card design exhibiting the elegant impression of color or texture. Thus, various attempts have been made to find a new metallic material and to improve the design of a metal payment card.

SUMMARY

The present disclosure provides a metal payment card, which is made from at least one of liquid metal alloy, aluminum alloy and copper alloy to enhance durability and has a pattern region capable of giving a unique tangible aesthetic impression to a cardholder, and a method of manufacturing the same.

The metal payment card and the manufacturing method thereof according to one aspect of the present disclosure also provide making various patterns integrally formed together with a main body of a metal card by injection molding, or simply making a pattern sheet by laser welding or metal bonding.

The metal payment card and the manufacturing method thereof according to one aspect of the present disclosure also provide an auxiliary body, where the main body and the auxiliary body are joined using a low-temperature metal adhesive.

The metal payment card and the manufacturing method thereof according to one aspect of the present disclosure also provide mounting an RFID tag for non-contact payment.

The metal payment card and the manufacturing method thereof according to one aspect of the present disclosure also provide mounting an IC chip.

To address the above problems, one embodiment of the present disclosure provides a metal payment card including a main body, which is made from at least one of a liquid metal alloy, aluminum alloy and copper alloy and includes a tangible pattern region.

In this embodiment, the main body and the pattern region may be integrally formed by injection molding. Alternatively, a sheet having the pattern region may be processed separately and the sheet may be laser welded or metal bonded to a front surface of the main body.

The pattern region may be embossed or engraved in at least one of a linear shape, a circular shape, an oval shape, a water drop shape, a rugby ball shape, a polygonal shape, a honeycomb shape, a stepped shape and a striped shape.

Another embodiment of the present disclosure provides a metal payment card further including an auxiliary body that is joined at a front surface thereof to a back surface of the main body. The main body and the auxiliary body may be joined using a low-temperature metal adhesive.

A yet another embodiment of the present disclosure provides a metal payment card further including: an auxiliary body joined at a front surface thereof to a back surface of the main body; a guide portion formed on an edge of the back surface of the main body; and an insertion portion formed on an edge of the auxiliary body and correspondingly inserted into the guide portion of the main body.

In this embodiment, the guide portion may be integrally formed together with the main body by injection molding.

Furthermore, the guide portion may include a protrusion embossed in at least one corner of the back surface of the main body or an edge wall embossed on at least one edge of the back surface of the main body. The insertion portion of the auxiliary body may be engraved so as to be correspondingly inserted into the protrusion or the edge wall.

Also, another embodiment of the present disclosure provides a metal payment card further including an auxiliary body joined at a front surface thereof to a back surface of the main body, wherein the back surface of the main body is further formed with an embossed or engraved pattern region and the auxiliary body is formed with an embossed or engraved pattern region corresponding to the pattern region of the back surface of the main body.

A yet another embodiment of the present disclosure provides a metal payment card further including: an electrical shield joined at a front surface thereof to a back surface of the main body; an RFID tag mounted on a back surface of the electrical shield; and an auxiliary body joined to a back surface of the RFID tag.

A still another embodiment of the present disclosure provides a metal payment card, wherein the main body is non-conduction treated and is formed with an engraved pocket in which an RFID tag is mounted. The metal payment card further includes: a non-conduction treated metal plate joined to the engraved pocket as covering the RFID tag; and an auxiliary body joined at a front surface thereof to a back surface of the main body.

Furthermore, another embodiment of the present disclosure provides a metal payment card, wherein a keypad including one or more buttons is formed on a front surface of the main body. The metal payment card further includes: a light emitting diode panel joined at a front surface thereof to a back surface of the main body, the light emitting diode panel being formed with a button dome, and an auxiliary body joined to a back surface of the light emitting diode panel.

In this embodiment, the auxiliary body includes a first auxiliary body mounted on the back surface of the light emitting diode panel and a second auxiliary body mounted on a back surface of the first auxiliary body.

An organic light emitting diode (OLED) panel may be used as the light emitting diode panel.

Also, another embodiment of the present disclosure provides a metal payment card wherein a large number of holes are formed in a front surface of the main body. The metal payment card further includes: a light emitting diode panel joined at a front surface thereof to a back surface of the main body; and an auxiliary body joined to a back surface of the light emitting diode panel.

In this embodiment, an organic light emitting diode (OLED) panel may be used as the light emitting diode panel.

Another embodiment of the present disclosure provides a metal payment card, wherein the main body is non-conduction treated and is formed with a hole. The metal payment card further includes: a first auxiliary body in which an IC chip is mounted; and a second auxiliary body. The first auxiliary body is mounted on a front surface of the second auxiliary body and the second auxiliary body is joined at a front surface thereof to a back surface of the main body such that the first auxiliary body is correspondingly joined to the hole.

A yet another embodiment of the present disclosure provides a metal payment card, wherein the main body is non-conduction treated and is formed with a hole. The metal payment card further includes: a first auxiliary body, in which an IC chip is mounted, correspondingly joined to the hole; and a second auxiliary body joined at a front surface thereof to back surfaces of the main body and the first auxiliary body.

Another embodiment of the present disclosure provides a metal payment card, wherein the main body includes an IC chip panel. The metal payment card further includes an auxiliary body joined at a front surface thereof to a back surface of the main body.

The main body may have a front surface including a card-associated information formed by engraving, laser marking or printing.

Further, to address the above problems, the present disclosure provides a method of manufacturing a metal payment card, which includes: forming a main body from at least one of a liquid metal alloy, aluminum alloy and copper alloy; and providing a tangible pattern region in the main body.

The providing of the pattern region may include forming the main body and the pattern region integrally formed by injection molding. Alternatively, a sheet having the pattern region may be processed and then the sheet may be laser welded or metal bonded to a front surface of the main body.

The providing of the pattern region may include embossing or engraving the pattern region in at least one shape of a linear shape, a circular shape, an oval shape, a water drop shape, a rugby ball shape, a polygonal shape, a honeycomb shape, a stepped shape and a striped shape.

Another embodiment of the present disclosure provides a method of manufacturing a metal payment card, which further includes: providing an auxiliary body, which is coated with a low-temperature metal adhesive, on a back surface of the main body; and joining the main body and the auxiliary body by low-temperature pressing.

The providing of the auxiliary body may include: laminating a plastic sheet and coating a front surface of the plastic sheet with the low-temperature metal adhesive; and drying and then punching the plastic sheet to provide the auxiliary body.

Another embodiment of the present disclosure provides a method of manufacturing a metal payment card, which further includes: forming a guide portion in an edge of a back surface of the main body; providing an auxiliary body and forming an insertion portion, which is correspondingly inserted to the guide portion of the main body, at an edge of the auxiliary body; and joining a front surface of the auxiliary body to a back surface of the main body.

The forming of the guide portion may include forming the guide portion integrally together with the main body by injection molding.

Alternatively, the forming of the guide portion includes embossing or engraving a protrusion in at least one corner of the back surface of the main body or forming an edge wall in at least one edge of the back surface of the main body. Further, the forming of the insertion portion may include engraving the insertion portion of the auxiliary body so as to be correspondingly inserted to the protrusion or the edge wall.

A yet another embodiment of the present disclosure provides a method of manufacturing a metal payment card, which further includes: embossing or engraving a pattern region in a back surface of the main body; providing an auxiliary body and embossing or engraving a pattern region corresponding to the pattern region of the back surface of the main body.

A still another embodiment of the present disclosure provides a method of manufacturing a metal payment card, which further includes: joining a front surface of an electrical shield to a back surface of the main body; mounting an RFID tag in a back surface of the electrical shield; and joining an auxiliary body joined to a back surface of the RFID tag.

Another embodiment of the present disclosure provides a method of manufacturing a metal payment card, which further includes: non-conduction treating the main body and forming an engraved pocket in the main body; mounting an RFID tag in the engraved pocket; providing a metal plate and non-conduction treating the metal plate and joining the metal plate to the engraved pocket so as to cover the RFID tag; and joining an auxiliary body to a back surface of the main body.

A yet another embodiment of the present disclosure provides a method of manufacturing a metal payment card, which further includes: forming a keypad including one or more buttons in a front surface of the main body; joining a front surface of a light emitting diode panel to a back surface of the main body, the light emitting diode panel being formed with a button dome; and joining an auxiliary body to a back surface of the light emitting diode panel.

In this embodiment, the auxiliary body includes a first auxiliary body mounted on the back surface of the light emitting diode panel and a second auxiliary body mounted on a back surface of the first auxiliary body.

In this embodiment, an organic light emitting diode (OLED) panel may be used as the light emitting diode panel.

Another embodiment of the present disclosure provides a method of manufacturing a metal payment card, which further includes: forming a large number of holes in a front surface of the main body; joining a front surface of a light emitting diode panel to a back surface of the main body; and joining an auxiliary body to a back surface of the light emitting diode panel.

In this embodiment, an organic light emitting diode (OLED) panel may be used as the light emitting diode panel.

Also, an embodiment of the present disclosure provides a method of manufacturing a metal payment card, which further includes: non-conduction treating the main body and forming a hole in the main body; providing a first auxiliary body in which an IC chip is mounted; and mounting the first auxiliary body on a front surface and then joining the front surface of a second auxiliary body to a back surface of the main body so as to correspond to the hole formed in the main body.

Furthermore, another embodiment of the present disclosure provides a method of manufacturing a metal payment card, which further includes: non-conduction treating the main body and forming a hole in the main body; mounting an IC chip and joining the first auxiliary body to the main body so as to correspond to the hole formed in the main body; and joining a front surface of a second auxiliary body to back surfaces of the main body and the first auxiliary body.

Moreover, another embodiment of the present disclosure provides a method of manufacturing a metal payment card, which further includes: forming the main body comprising an IC chip panel; and joining a front surface of an auxiliary body to a back surface of the main body.

The method of manufacturing a metal payment card may further include forming a card-associated information in a front surface of the main body by engraving, laser marking or printing.

According to the metal payment card and the manufacturing method thereof of the present disclosure, the metal payment card is made from at least one of a liquid metal alloy, aluminum alloy and copper alloy, thus reducing damages resulting from the external circumstances and enhancing durability.

Further, according to the metal payment card and the manufacturing method thereof of the present disclosure, the metal payment card can be easily manufactured by integrally forming the pattern region, which is capable of giving a tangible aesthetic impression, through injection molding, or by processing the pattern region sheet separately and then laser welding or metal bonding the same.

Also, according to the metal payment card and the manufacturing method thereof of the present disclosure, the main body and the auxiliary body can be firmly joined together by using the low-temperature metal adhesive.

Moreover, the metal payment card and the manufacturing method thereof of the present disclosure include the RFID tag and thus accomplish non-contact payment, thereby imparting a novel function to the metal payment card.

Furthermore, the metal payment card and the manufacturing method thereof of the present disclosure include an IC chip, thus accomplishing various functions such as an automated device, a transportation card, etc.

BRIEF DESCRIPTION OF THE DRAWINGS

FIGS. 4A to 4H are perspective views schematically showing metal payment cards 104a to 104h according to embodiments of the present disclosure, wherein various patterns (a circular shape, oval shape, rugby ball shape, honeycomb shape, stepped shape, polygonal shape, etc.) are formed.

FIGS. 7A and 7B schematically show a metal payment card according to a still another embodiment of the present disclosure, which includes a main body having a combination of a protrusion and an edge wall, and a method of manufacturing the same.

FIG. 18 is a flow chart showing in detail a method of manufacturing a metal payment card according to an embodiment of the present disclosure, which uses injection molding.

DETAILED DESCRIPTION

Certain preferred embodiments of the present disclosure are described in detail with reference to the accompanying drawings.

The term a "payment card," as used herein, refers to all types of cards used for money payment, money accumulation, replenishment, deposit, withdrawal, etc., such as a credit card, a check card (debit card), a transportation card, a membership card, a replenishment card, a point card, etc.

Figure 1:
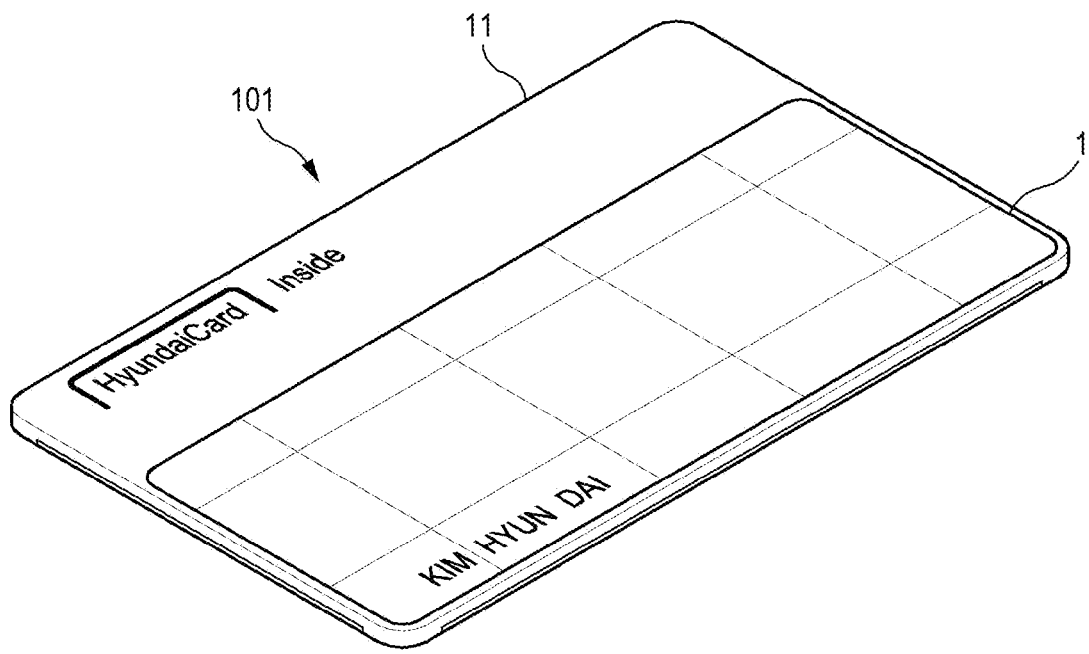
FIG. 1 is a schematic perspective view of a metal payment card according to an embodiment of the present disclosure.

FIG. 1 shows a perspective view of a metal payment card according to an embodiment of the present disclosure.

Referring to FIG. 1, the metal payment card 101 according to an embodiment of the present disclosure includes a main body 11 made from at least one of a liquid metal alloy, aluminum alloy and copper alloy. The main body 11 is provided with a tangible pattern region 1 that is capable of giving a visual aesthetic impression as well as a tangible aesthetic impression.

The pattern region 1 may be directly formed on the main body 11. Alternatively, the pattern region 1 may be made separately from the main body 11 and then bonded to the main body. The pattern region 1, which is made separately from the main body 11, is also made from liquid metal alloy or aluminum alloy and may be made from the same metal as the main body 11 or metal different from the main body 11.

The liquid metal alloy is an advanced material, which is referred to as amorphous alloy, and is manufactured by mixing zirconium (Zr) with titanium (Ti), beryllium (Be), nickel (Ni), copper (Cu), etc. The liquid metal alloy may have a surface as smooth as liquid. As for the physical property of the liquid metal alloy, the liquid metal alloy may be lighter than iron and has strength three times greater than that of iron. Further, the liquid metal alloy has high strength and elasticity since it maintains an amorphous structure in a solid phase. Thus, the liquid metal alloy may be advantageously used as a material for a payment card.

Also, a high-strength aluminum alloy such as scandium aluminum alloy, hyperduralumin, kaiseraluminum, etc., may be used as said aluminum alloy. The aluminum alloy may also be used as the material for a metal payment card since it has advantages of high strength and good moldability.

Further, the copper alloy may be a copper alloy comprising copper (Cu), manganese (Mn), aluminum (Al), tin (Sn) and nickel (Ni), copper alloy comprising copper (Cu), manganese (Mn), aluminum (Al), tin (Sn), nickel (Ni) and iron (Fe), etc. The copper alloy has a yield strength approximately two times greater than that of stainless steel. The copper alloy has excellent reliability in terms of tensile force, plating, painting, etc. The copper alloy also has excellent processability in terms of trimming, plating, painting, tapping, etc. By way of example, C157, which comprises: 69.80 to 71.80% by weight of Cu; 12.52 to 14.52% by weight of Mn; 3.00 to 5.00% by weight of Al; 6.80 to 8.80% by weight of Sn; 1.90 to 3.90% by weight of Ni; and 0.09 to 1.90% by weight of Fe, may be used as said copper alloy. The copper alloy may also be used as the material for a metal payment card.

Furthermore, a card-associated information may be shown on a front or back surface of the metal payment card through engraving, laser marking or printing. The card-associated information may be a card company information, cardholder information, serial card number, identification number, basic card information, logo, etc.

The engraving refers to a technology that engraves patterns, letters, numerals, symbols, etc., on metal by means of an engraving device which cuts metal in part by a sharp tool. The laser marking refers to a technology that etches patterns, letters, numerals, symbols, etc., into a surface of metal by means of a laser light. As for the printing, patterns, letters, numerals, symbols, etc., may be made on a surface of metal by jetting ink onto the surface of metal. Where the main body 11 specifically has a thickness of about 0.75 mm to 0.85 mm and an engraved or laser-marked recognition region (e.g., HYUNDAI CARD, KIM HYUN DAI), it is appropriate to remove a surface of the main body by about 0.25 mm to 0.3 mm for forming the recognition region.

The pattern region 1 provided in the main body 11 may be formed in the front surface or the back surface of the main body 11. The pattern region 1 may be made to have a design capable of giving a visual or tangible aesthetic impression to a cardholder. To give a tangible aesthetic impression, the pattern region may be formed with a prominence-depression portion by engraving or embossing it. This allows the pattern region to give a peculiar finger-tangible impression to a cardholder when the cardholder grasps the payment card. The engraved or embossed pattern region may be formed in the front surface or the back surface of the main body 11 in an isolated or a continuous form.

In this embodiment, the main body 11 and the pattern region 1 may be integrally formed by injection molding. The metal payment card 101 according to the embodiment of the present disclosure may be manufactured through the following manner: making a mold for injection molding, which is shaped to correspond to the main body 11 and the pattern region 1; injecting molten liquid metal alloy or molten aluminum alloy into a molding space; and cooling the mold.

In the metal payment card according to an embodiment of the present disclosure, a pattern region sheet may be processed separately and then bonded to the metal payment card by laser welding or metal bonding. In this case, the pattern region sheet may be made from at least one of the liquid metal alloy, aluminum alloy and copper alloy. The pattern region sheet and the main body, to which the pattern region sheet is bonded, may be made from the same alloy or different alloy.

Figure 2A:
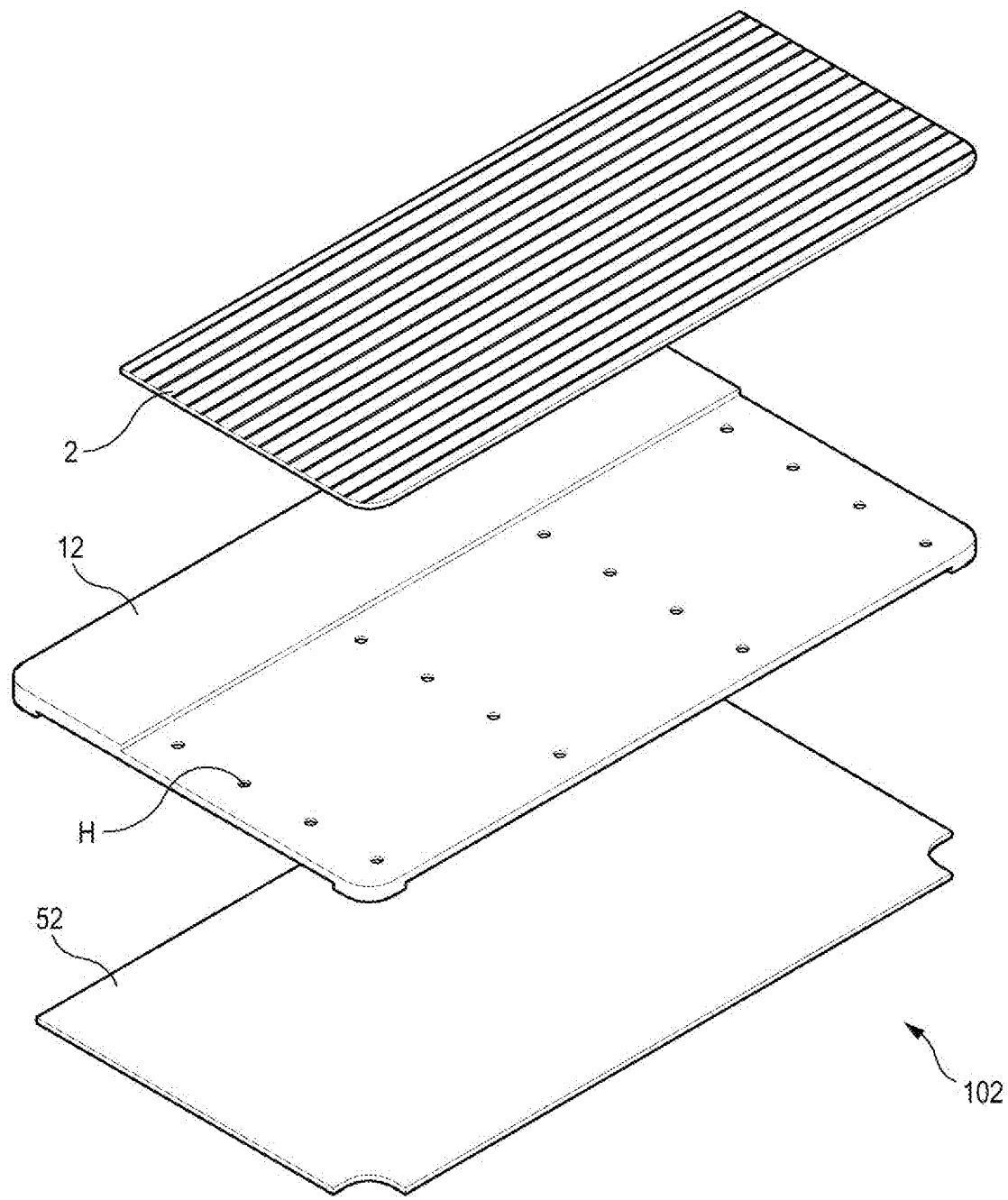
FIGS. 2A and 2B schematically show a metal payment card according to an embodiment of the present disclosure, wherein a sheet having a pattern region is processed separately and is then adhered to a main body using laser welding, and a method of manufacturing the same.
Figure 2B:
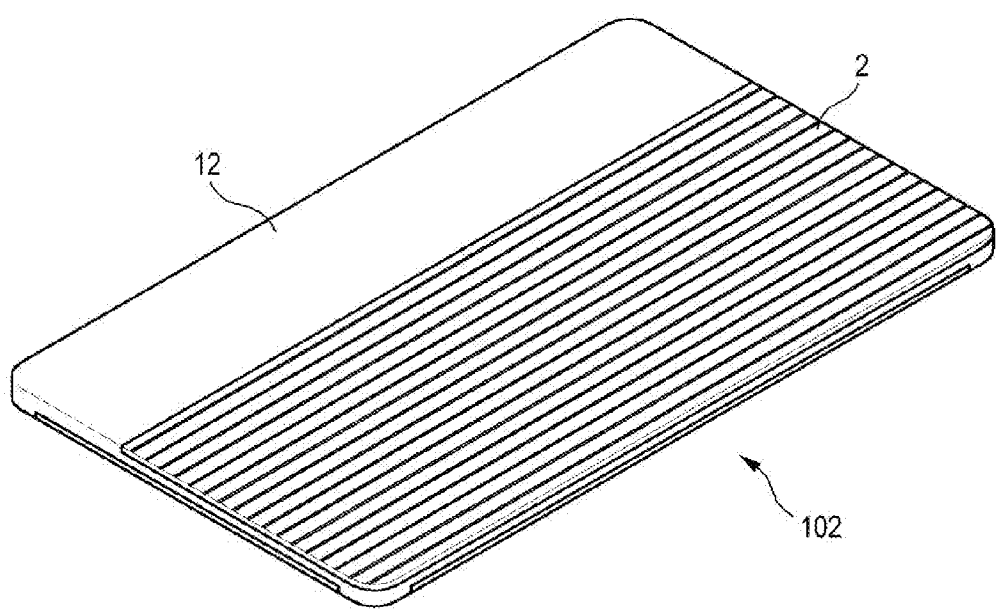

FIG. 2A shows that a sheet 2 having a pattern region is processed separately and is then bonded to a main body 12 using laser welding, in the metal payment card 102 according to an embodiment of the present disclosure. FIG. 2B shows the completed metal payment card 102 according to an embodiment of the present disclosure, which has the pattern region sheet 2.

According to a method of manufacturing the metal payment card 102 according to an embodiment of the present disclosure, a metal sheet 2 having the pattern region is made first and holes H are formed in the main body 12. Subsequently, a laser beam is irradiated onto the metal sheet 2 through the holes H of the main body 12 to make molten spots in the metal sheet 2 and then the sheet 2 is bonded to the main body 12. Thereafter, to bond a front surface of an auxiliary body 52 to a back surface of the main body 12, an adhesive is applied on the auxiliary body 52 and the auxiliary body 52 is bonded to the main body 12. In this case, the auxiliary body 52 is generally made from a plastic material such as polycarbonate, but the material of the auxiliary body is not limited thereto.

The laser welding refers to a process method for welding metal using a laser beam. The surface of a focal spot, to which a laser beam is irradiated, is molten in an instant (1 ms to 12 ms) to about 6000 degrees C. to 6400 degrees C. due to a high energy density. The laser welding is performed by fusion-bonding the molten surface to a bonded target and cooling the same. The laser welding is accurate and precise and is thus applicable to different kinds of metals or non-contact processes. The laser welding may be advantageously used for manufacturing the metal payment card since it accomplishes precise welding.

In this embodiment, striped patterns are formed in the pattern region sheet 2. However, the patterns are not limited to a striped shape. It is a matter of course that various patterns may be formed in the pattern region.

Figure 3A:
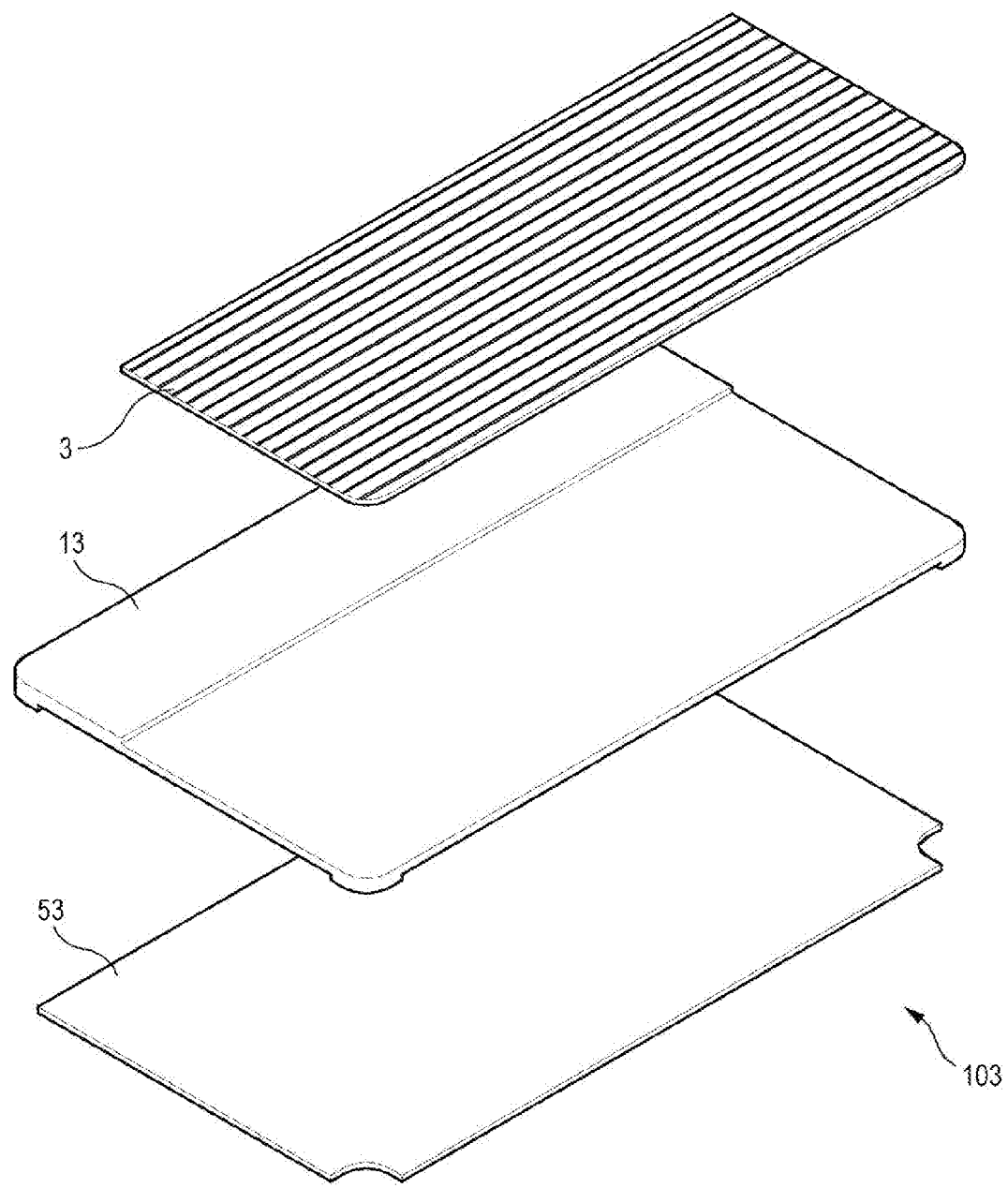
FIGS. 3A and 3B show a metal payment card according to an embodiment of the present disclosure, wherein a metal sheet having a pattern region is processed separately and is then adhered to a main body using metal bonding, and a method of manufacturing the same.
Figure 3B:
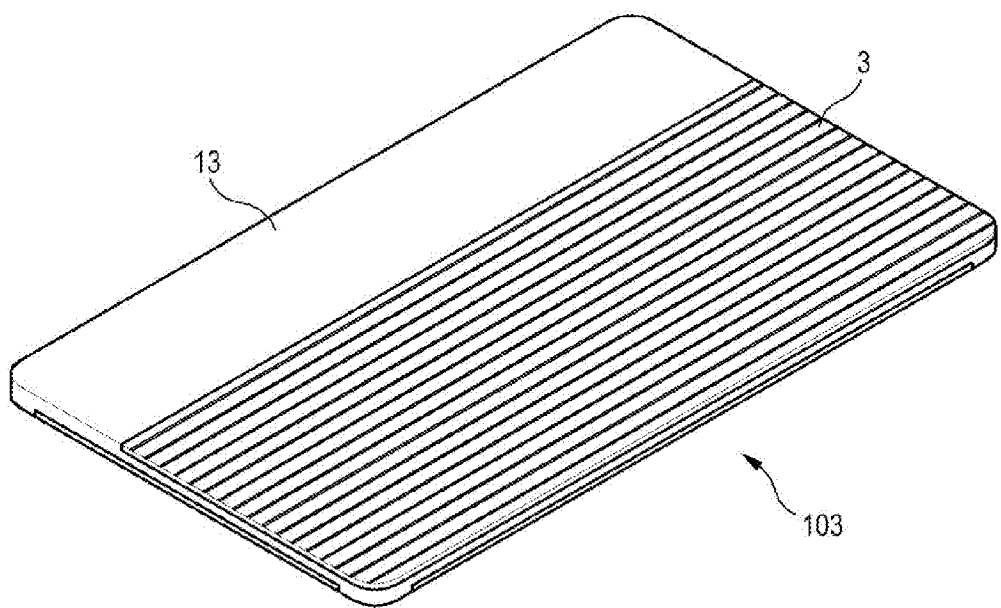

FIGS. 3A and 3B show a metal payment card according to an embodiment of the present disclosure, wherein a metal sheet 3 having a pattern region is processed separately and is then bonded to a main body 13 using metal bonding, and a method of manufacturing such a metal payment card 103.

Referring to FIG. 3A, to manufacture the metal payment card 103 according to an embodiment of the present disclosure, the metal sheet 3 is first formed and is then bonded to the main body 13 using metal bonding. Thereafter, a front surface of an auxiliary body 53 is joined to a back surface of the main body 13, thus completing the metal payment card 103 wherein the pattern region sheet 3 having striped patterns is bonded to a portion of the front surface of the main body 13 as shown in FIG. 3B.

In this embodiment, striped patterns are formed in the pattern region sheet 3. However, the patterns are not limited to a striped shape. It should be noted that the pattern region sheet may be formed with various patterns such as a linear shape, circular shape, oval shape, water drop shape, rugby ball shape, polygonal shape, honeycomb shape, stepped shape, striped shape, etc. At least one or more patterns among the patterns having the aforesaid shapes may be optionally formed, or a combination of those patterns may be formed.

FIGS. 4A to 4H schematically show metal payment cards 104a to 104h according to an embodiment of the present disclosure, in which various patterns are formed.

Figure 4A:
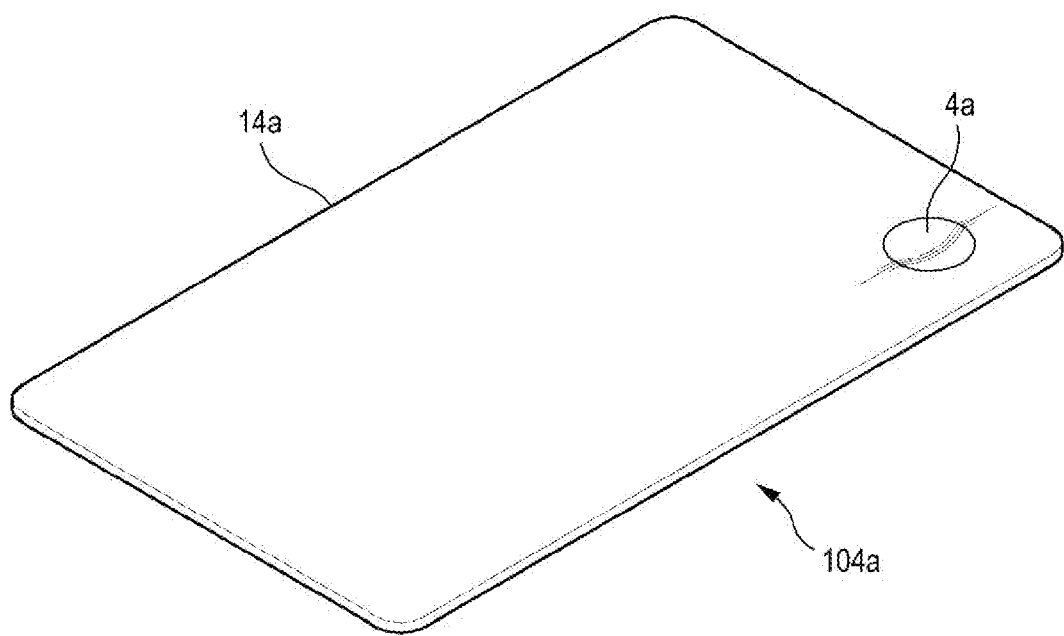
Figure 4B:
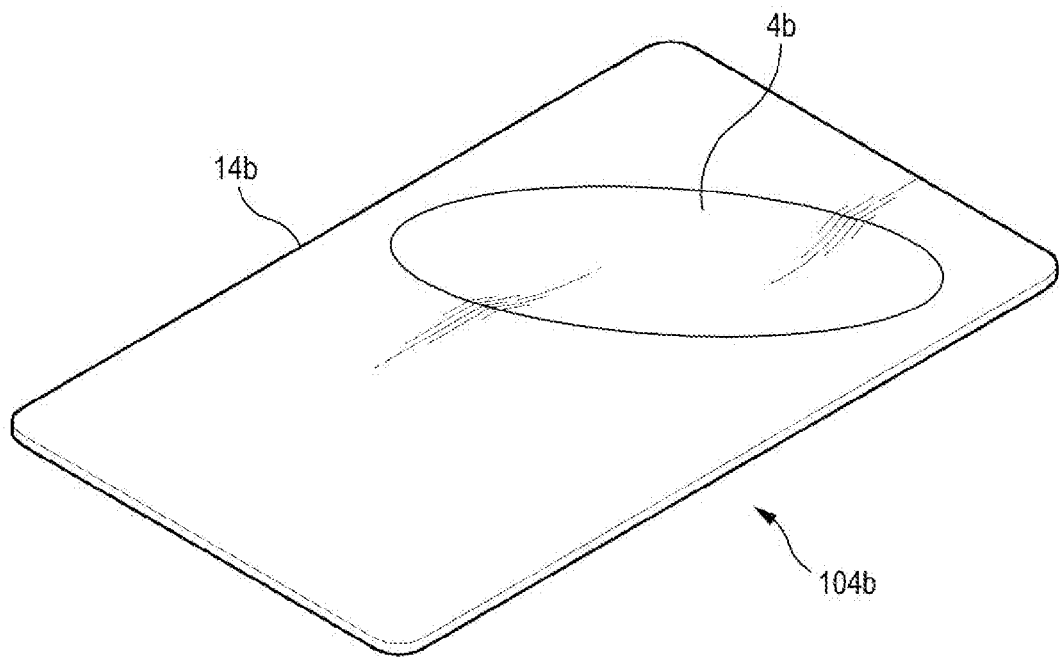
Figure 4D:
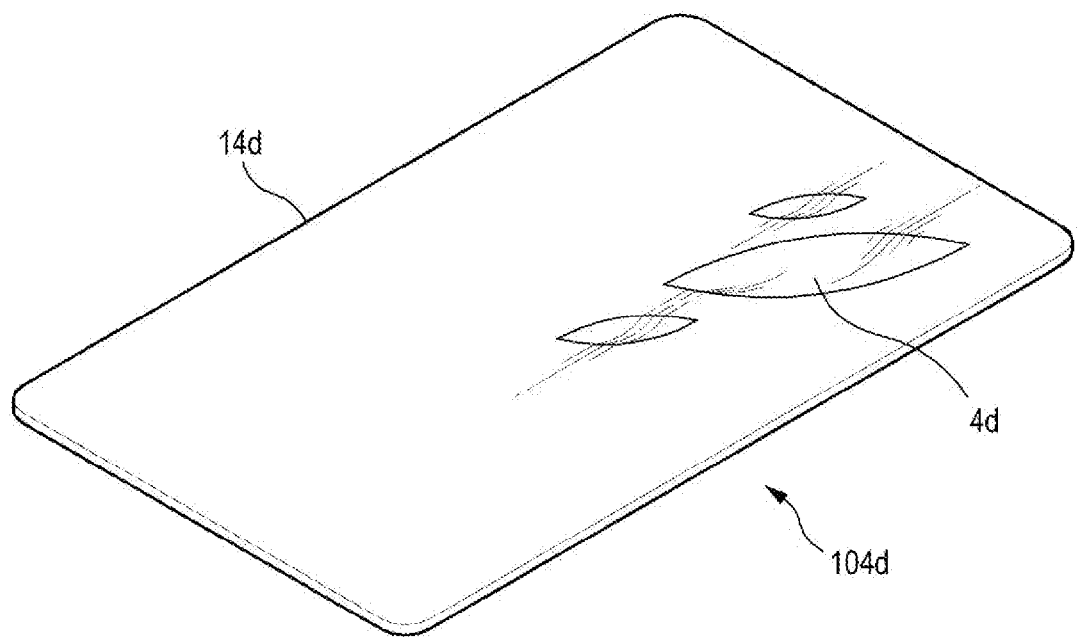
Figure 4E:
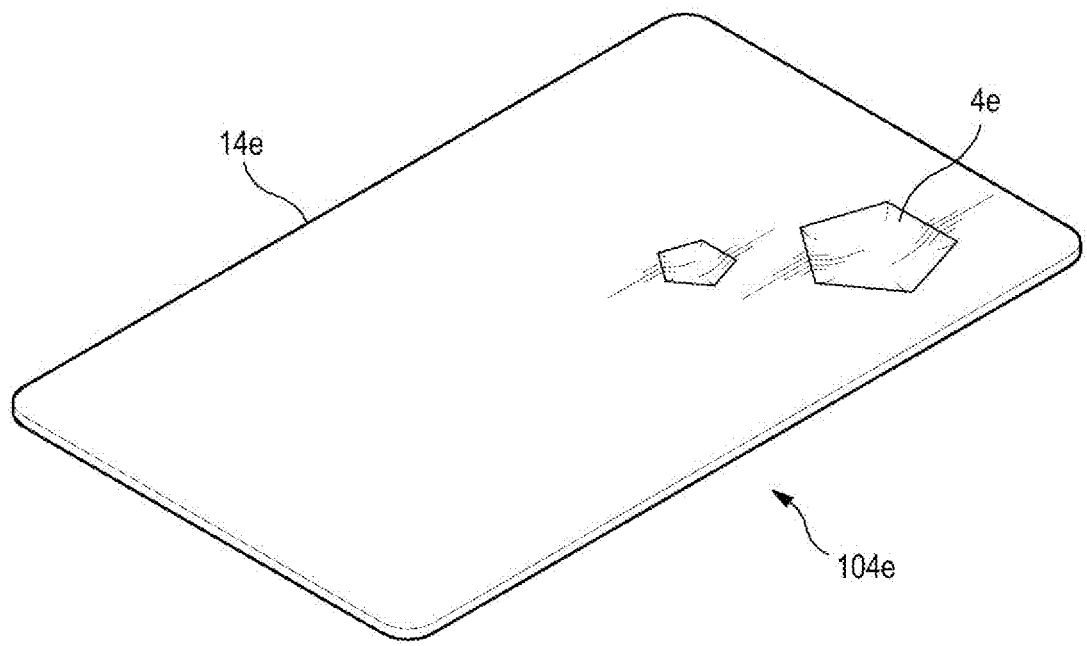
Figure 4F:
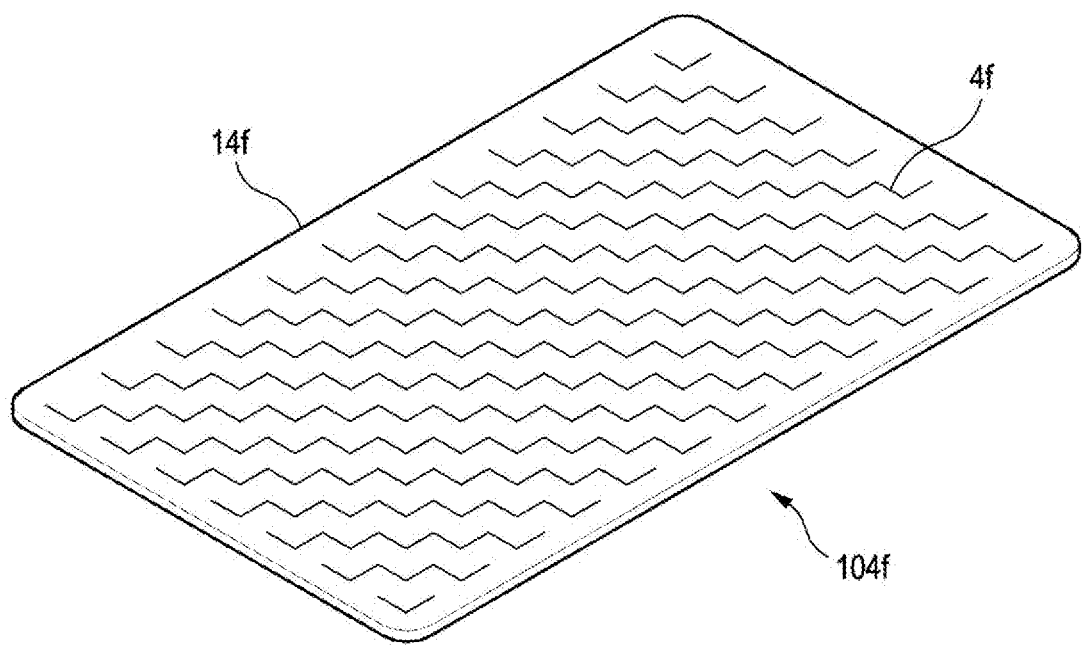
Figure 4G:
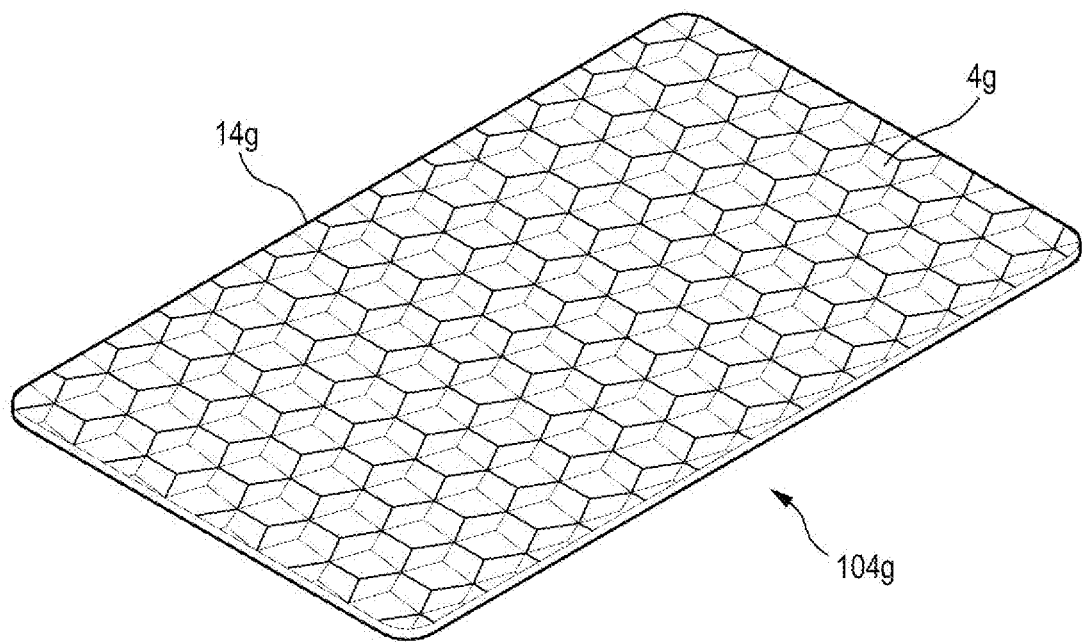
Figure 4H:
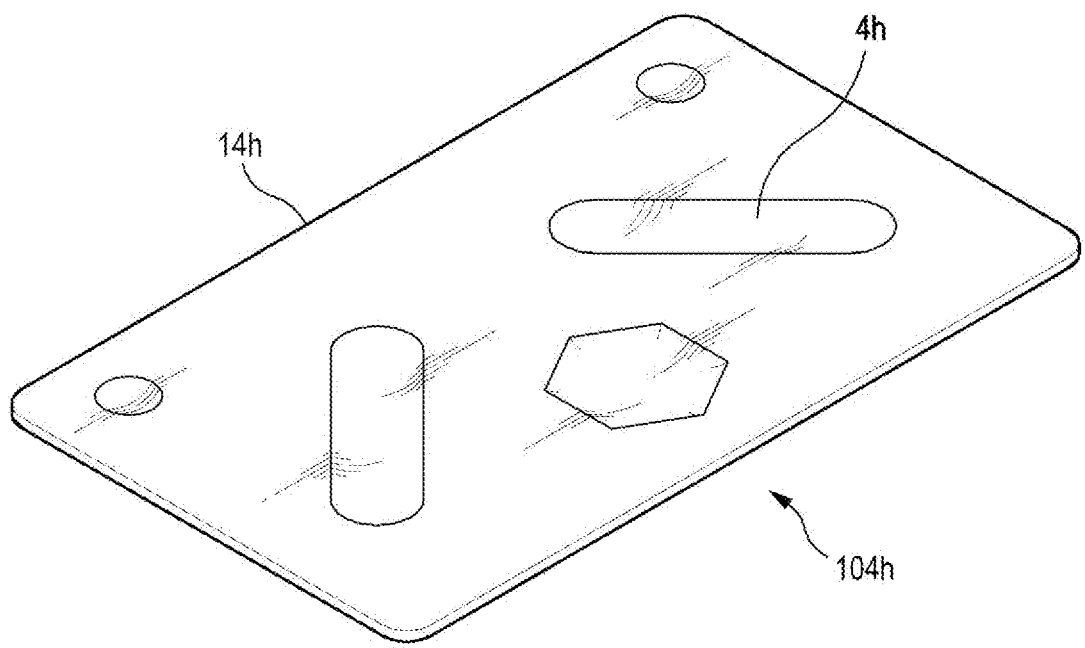

FIG. 4A shows the metal payment card 104a wherein a circular pattern region 4a is formed in the vicinity of a corner of a main body 14a. FIG. 4B shows the metal payment card 104b wherein an oval pattern region 4b inclined obliquely is formed in a main body 14b. FIG. 4C shows the metal payment card 104c wherein an oblong pattern region 4c is formed in the main body as being adjacent to one edge of a main body 14c. FIG. 4D depicts the metal payment card 104d wherein a pattern region 4d having three small or large rugby ball-shaped patterns is formed in a main body 14d. FIG. 4E show the metal payment card 104e wherein a pattern region 4e having two small or large pentagonal patterns is formed in a main body 14e. FIG. 4F shows the metal payment card 104f wherein a stepped pattern region 4f is formed in a front surface of a main body 14f. FIG. 4G shows the metal payment card 104g wherein a honeycomb pattern region 4g is formed in a front surface of a main body 14g. FIG. 4H shows the metal payment card 104h including a main body 14h having a pattern region 4h with a combination of a circle and a polygon.

The above-described pattern regions are formed in the main body of the metal payment card. It should be noted that the pattern region sheet is separately provided and may be joined to the main body of the metal payment card. The pattern region sheet may be joined to the main body using injection molding, laser welding, metal bonding, etc.

The preferred embodiments of the metal payment card according to the present disclosure have been described by way of example of various pattern regions shown in the figures. However, it should be noted that the above-described embodiments are not intended to limit the scope of the present disclosure.

Figure 5A:
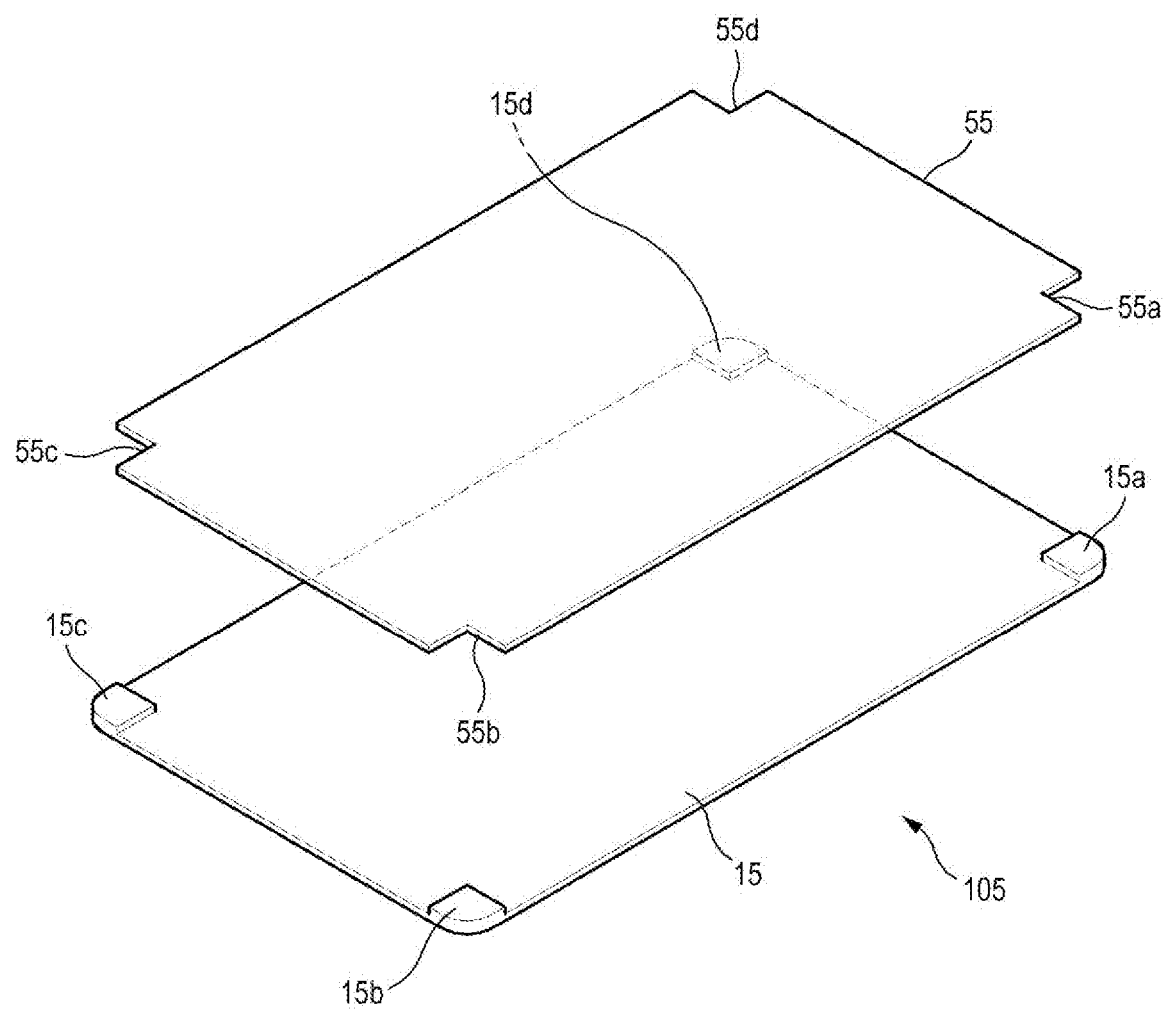
FIGS. 5A and 5B schematically show a metal payment card according to another embodiment of the present disclosure, which includes a main body formed with a protrusion, and a method of manufacturing the same.
Figure 5B:
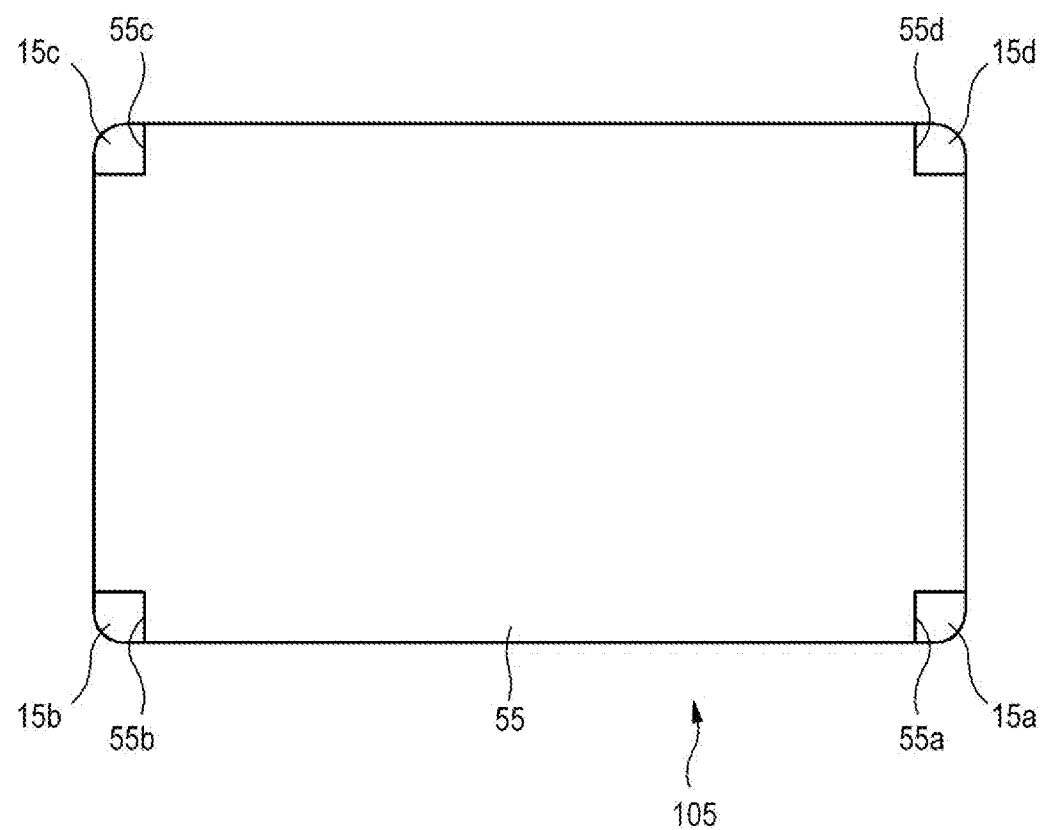

FIGS. 5A and 5B show a metal payment card 105 according to another embodiment of the present disclosure, which includes a main body 15 formed with protrusions, and a method of manufacturing the same.

Referring to FIG. 5A, the metal payment card 105 according to an embodiment of the present disclosure includes: a main body 15 made from at least one of a liquid metal alloy, aluminum alloy and copper alloy; and an auxiliary body 55 joined at its front surface to a back surface of the main body 15. Guide portions 15a, 15b, 15c, 15d are provided at edges of the back surface of the main body 15. Further, insertion portions 55a, 55b, 55c, 55d, which are correspondingly inserted to the guide portions 15a, 15b, 15c, 15d, are provided at the edges of the auxiliary body 55.

In this embodiment, the guide portions 15a, 15b, 15c, 15d are made in the form of a protrusion embossed on the respective corner on the back surface of the main body 15. The guide portions may be integrally formed together with the main body 15 by injection molding.

The insertion portions 55a, 55b, 55c, 55d of the auxiliary body 55 are engraved so as to engage the guide portions 15a, 15b, 15c, 15d embossed on the main body 15.

In this embodiment, the method of manufacturing the metal payment card 105 according to an embodiment of the present disclosure uses a silk screen coating method using a low-temperature adhesive for metal, in order to bond the auxiliary body 55 to the main body 15. A liquid adhesive for screen printing is used as the low-temperature metal adhesive. The low-temperature metal adhesive is inexpensive and is easily controlled with regard to a coating region and a coating thickness, when compared with a high-temperature fused adhesive. Further, the low-temperature metal adhesive exhibits good adhesive properties, particularly for a plastic material.

First, a plastic sheet (PVC, etc.) is stamped at a suitable thickness (e.g., 0.3 mm) and is then taped. The temporarily-taped plastic sheet is first-laminated. Then, the top of the plastic sheet is silk-screen-coated with the low-temperature metal adhesive and is naturally dried for one day. The naturally-dried plastic sheet is first-punched to a standard size and then the first-punched plastic sheet is secondary-punched again, thus making the auxiliary body 55, which is bondable to the main body 15 made from liquid metal alloy. The auxiliary body 55 is fixed to the main body 15 and they are low-temperature pressed at approximately 50 degrees C. for thirty minutes, thus making the metal payment card 105. Generally, the low-temperature pressing operation first applies a pressure of about 0.3 to 0.6 MPa to the main body with the auxiliary body while heating them at about 120 to 180 degrees C. from room temperature and then holds the same at about 120 to 180 degrees C. for fifteen to sixty minutes under a pressure of about 0.7 to 1.5 MPa. Thereafter, the low-temperature pressing operation cools the main body with the auxiliary body from about 120 to 180 degrees C. to room temperature while applying a pressure of about 0.9 to 1.8 MPa.

The above-described method of joining the auxiliary body to the main body using the low-temperature metal adhesive may be used to a method of manufacturing a metal payment card according to another embodiment of the present disclosure.

FIG. 5B shows the finally-completed metal payment card 105, wherein the main body 15 and the auxiliary body 55 are in engagement with each other.

Figure 6A:
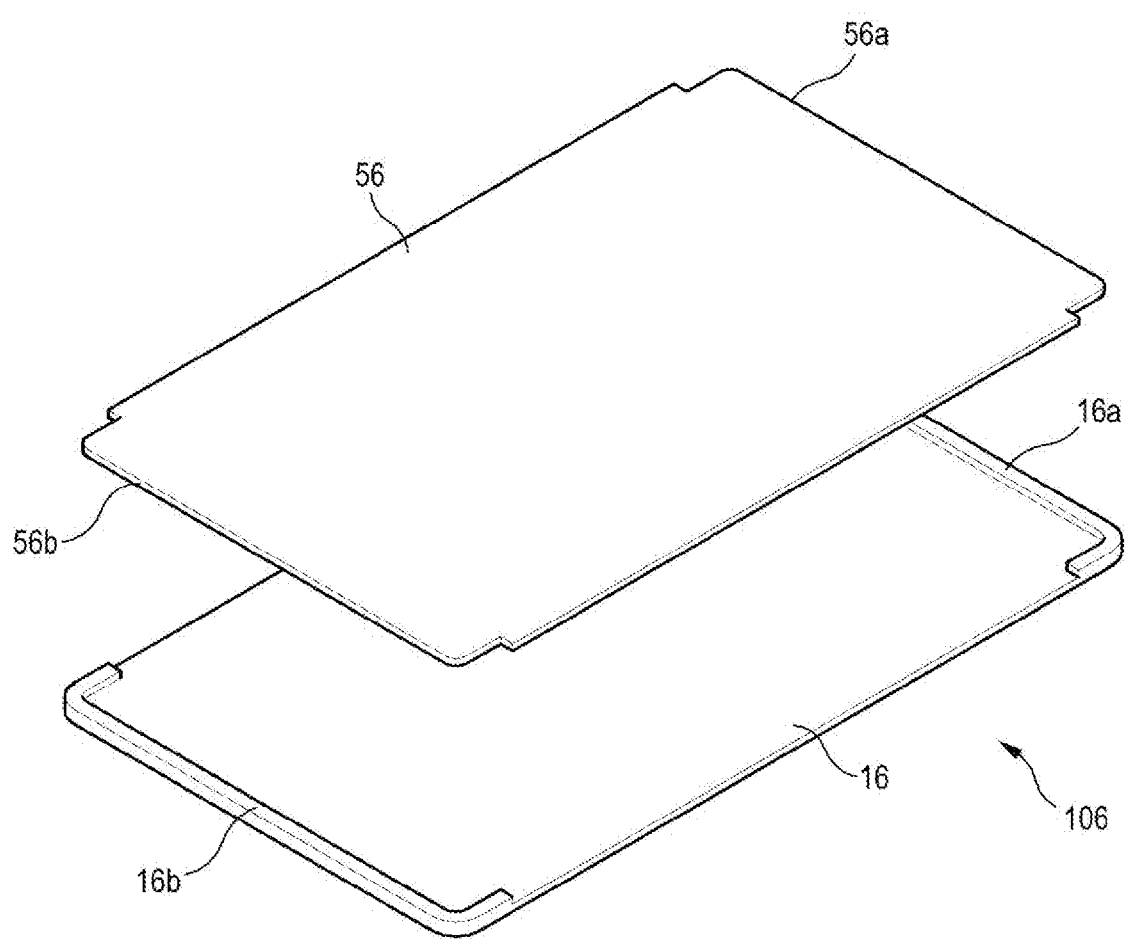
FIGS. 6A and 6B schematically show a metal payment card according to a yet another embodiment of the present disclosure, which includes a main body formed with an edge wall, and a method of manufacturing the same.
Figure 6B:
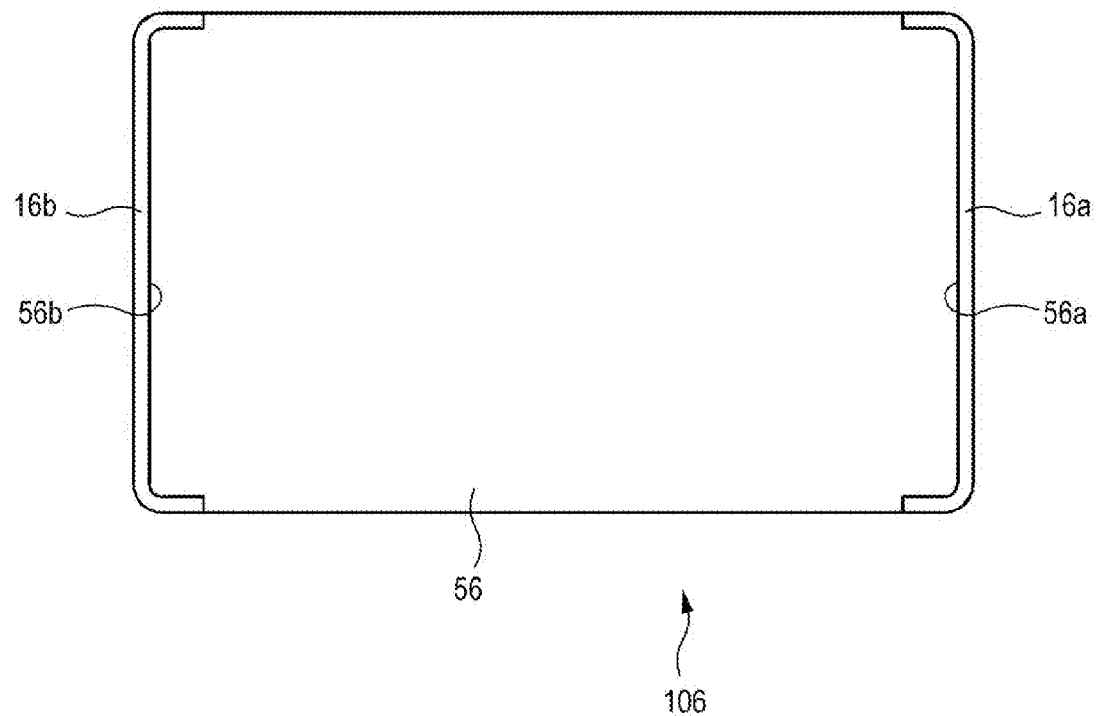

FIGS. 6A and 6B show a metal payment card 106 according to a yet another embodiment of the present disclosure, which includes a main body 16 formed with edge walls, and a method of manufacturing the same.

Referring to FIG. 6A, the metal payment card 106 according to an embodiment of the present disclosure includes: a main body 16 made from at least one of a liquid metal alloy, aluminum alloy and copper alloy; and an auxiliary body 56 joined at its front surface to a back surface of the main body 15. Guide portions 16a, 16b comprising an edge wall are provided at edges of the back surface of the main body 16. Insertion portions 56a, 56b, which are correspondingly inserted to the guide portions 16a, 16b, are formed at edges of the auxiliary body 56.

In this embodiment, the guide portions 16a, 16b are made in the form of an edge wall, which is embossed in one of the opposing edges on the back surface of the main body 16. The guide portions are integrally formed together with the main body 16 by injection molding. Further, to maintain stable coupling between the main body 16 and the auxiliary body 56, the guide portions 16a, 16b bend at 90 degrees at opposing ends of one edge and then continue to extend somewhat on another edge adjacent to the one edge.

The insertion portions 56a, 56b of the auxiliary body 56 are engraved so as to engage the guide portions 16a, 16b embossed in the main body 16. FIG. 6B shows the finally-completed metal payment card 106, wherein the main body 16 and the auxiliary body 56 are engaged with each other.

Figure 7A:
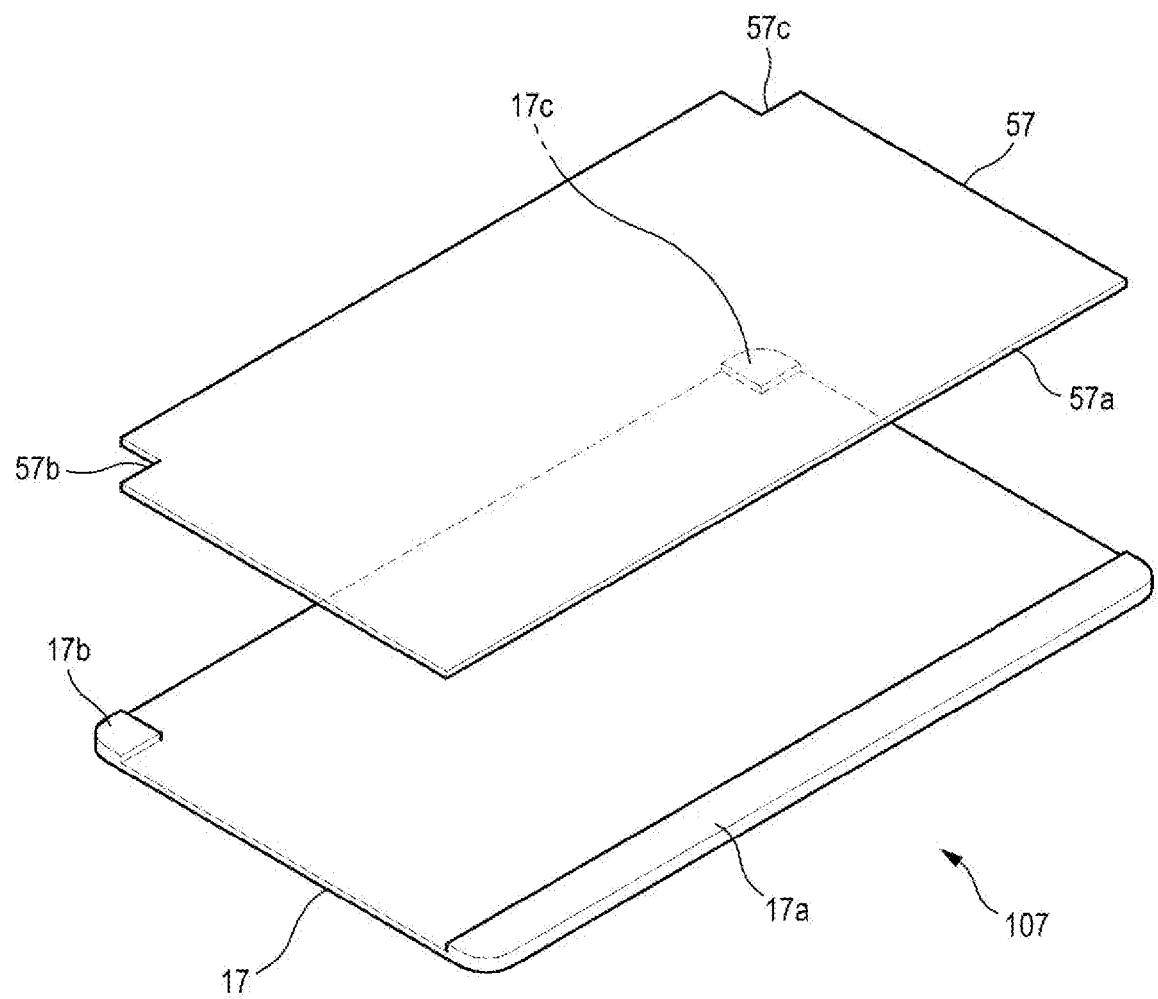

FIGS. 7A and 7B show a metal payment card 107 according to a still another embodiment of the present disclosure, which includes a main body 17 having a combination of a protrusion and an edge wall, and a method of manufacturing the same.

Referring to FIG. 7A, the metal payment card 107 according to an embodiment of the present disclosure includes: a main body 17 made from at least one of a liquid metal alloy, aluminum alloy and copper alloy; and an auxiliary body 57 joined at its front surface to a back surface of the main body 15. A guide portion 17a comprising an edge wall and guide portions 17b, 17c comprising a protrusion are provided at the edges of the back surface of the main body 17. Insertion portions 57a, 57b, 57c, which are correspondingly inserted to the guide portions 17a, 17b, 17c of the main body, are provided at the edges of the auxiliary body 57.

In this embodiment, the guide portions 17a, 17b, 17c are made in the form of an edge wall, which is embossed in an edge on the back surface of the main body 17, as well as a protrusion on two edges opposed to said edge. The guide portions may be integrally formed together with the main body 17 by injection molding.

The insertion portions 57a, 57b, 57c of the auxiliary body 57 are engraved so as to engage the guide portions 17a, 17b, 17c embossed in the main body 17. FIG. 7B shows the finally-completed metal payment card 107, wherein the main body 17 and the auxiliary body 57 are engaged with each other.

Figure 8:
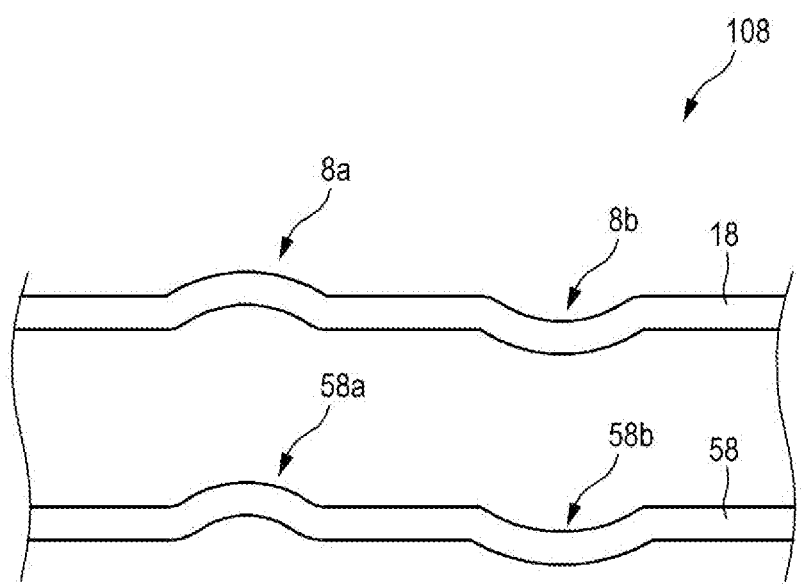
FIG. 8 is a sectional view schematically showing a metal payment card according to an embodiment of the present disclosure, wherein an auxiliary body is formed with a pattern corresponding to an embossed or engraved pattern formed in a main body.

FIG. 8 is a sectional view schematically showing a metal payment card 108 according to an embodiment of the present disclosure, wherein an auxiliary body 58 is formed with a pattern corresponding to an embossed or engraved pattern formed in a main body 18.

Referring to FIG. 8, a front surface of the main body 18 of the metal payment card 108 is formed with an embossed pattern 8a and an engraved pattern 8b. Further, the auxiliary body 58 is formed with an embossed pattern 58a and an engraved pattern 58b, which are correspondingly joined to the patterns of the main body.

Figure 9:
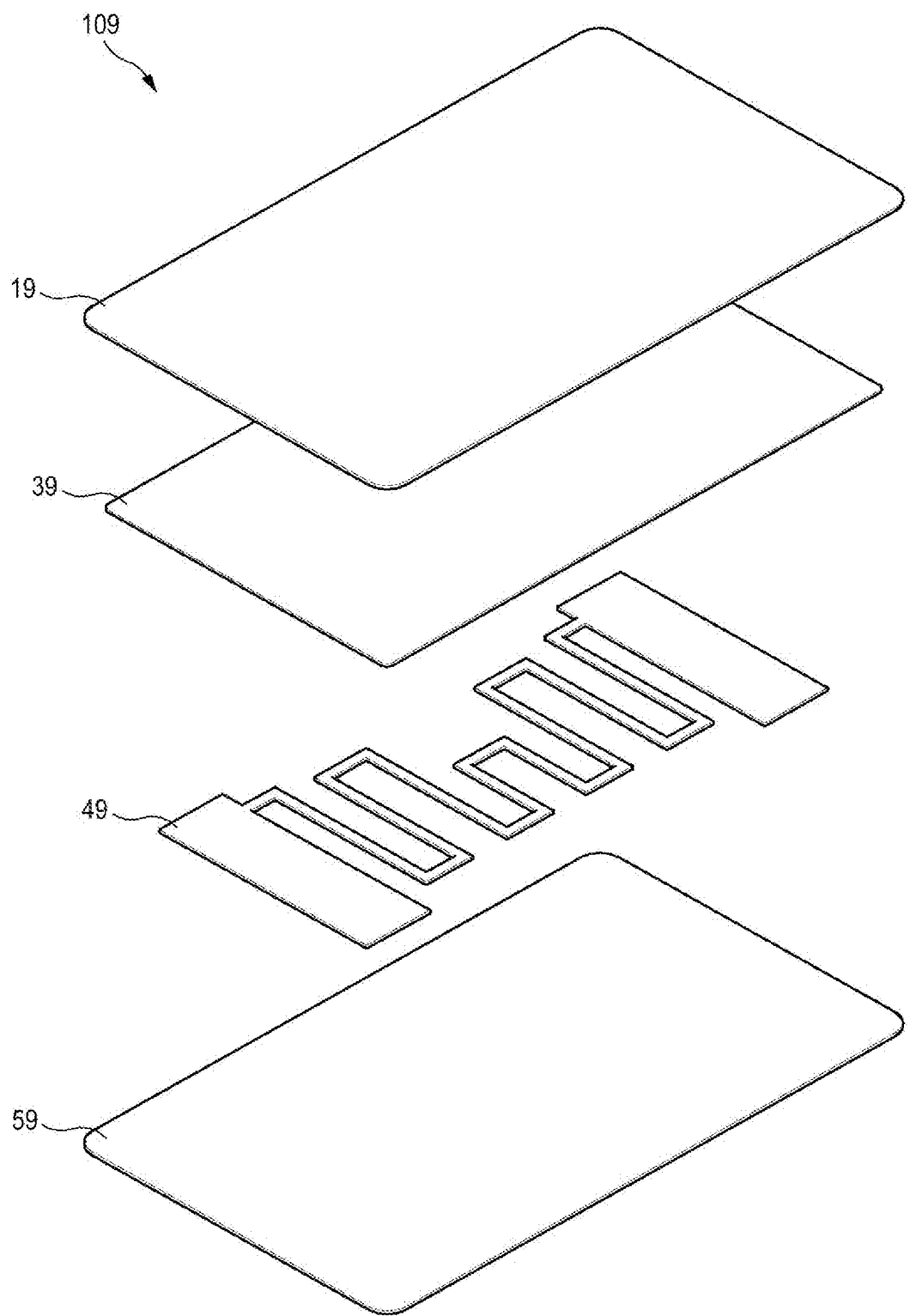
FIG. 9 schematically shows a metal payment card of a non-contact payment type according to an embodiment of the present disclosure, which includes an RFID tag, and a method of manufacturing the same.

FIG. 9 schematically shows a metal payment card 109 of a non-contact payment type according to an embodiment of the present disclosure, which includes an RFID tag, and a method of manufacturing the same.

Referring to FIG. 9, the metal payment card 109 according to an embodiment of the present disclosure includes: a main body 19 made from at least one of a liquid metal alloy, aluminum alloy and copper alloy; an electrical shield 39 bonded at its front surface to a back surface of the main body; an RFID tag 49 mounted on a back surface of the electrical shield 39; and an auxiliary body 59 joined to a back surface of the RFID tag 49.

An RFID tag technology generally refers to a technology that identifies the details of an object, tracks a transfer path, maintains a history in real-time, etc., through data communication between a reader and an object, to which a tag with a microchip and an antenna built in is attached, by means of a radio frequency. By applying such an RFID tag technology to a metal payment card, basic card information (a card number, expiration date, membership number, individual customer information, etc.) can be stored in the RFID tag. Further, the basic card information can be read from the RFID tag through the non-contact reading with a reader.

According to the metal payment card 109 using the RFID tag, a payment method can change from an existing contact manner to a non-contact manner. Regarding transmitting and receiving a radio frequency in a non-contact manner, an inductive coupling method, backscattering method, surface acoustic wave (SAW) method, etc., may be used depending upon the intensity of a frequency to be used, or a full duplex (FEX) method, half duplex (HDX) method, sequential (SEQ) method, etc. (all using electromagnetic waves), may be used.

As a radio frequency band for use in the RFID tag, for example, 13.56 MHZ and 900 MHZ that is currently commercialized may be used, but it is not limited to such an example.

If the RFID tag 49 is joined to a metallic main body 59, then an induced current cannot be sufficiently produced due to a phenomenon that an induced magnetic field to be received from an outer antenna reflects and scatters on a metallic surface, thus deteriorating the recognition rate of the RFID tag. Thus, to prevent electromagnetic interference, the electric shield 39 is interposed.

Figure 10:
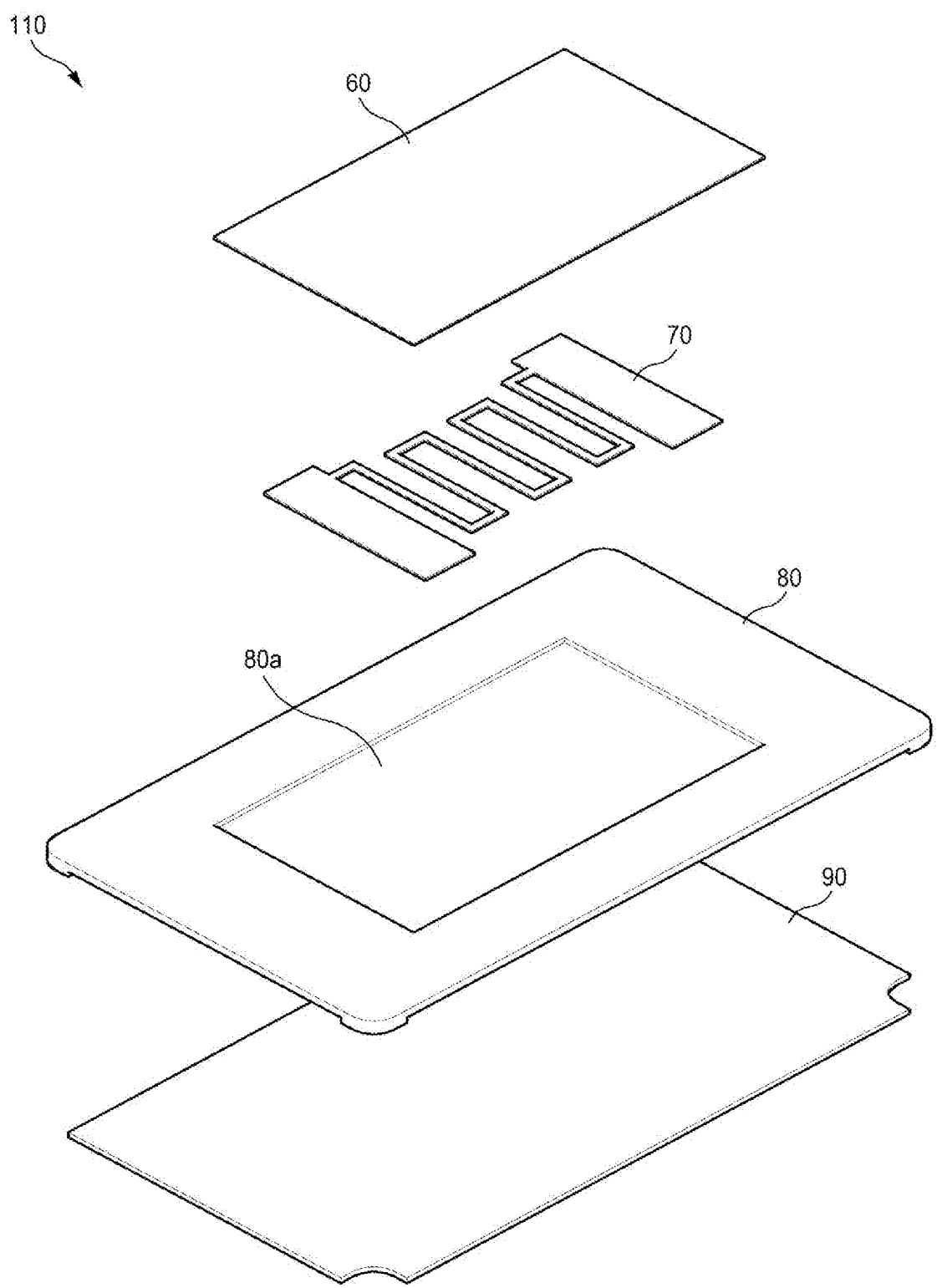
FIG. 10 schematically shows a metal payment card of a non-contact payment type according to another embodiment of the present disclosure, which includes an RFID tag, and a method of manufacturing the same.

FIG. 10 schematically shows a metal payment card 110 of a non-contact payment type according to another embodiment of the present disclosure, which includes an RFID tag, and a method of manufacturing the same.

Referring to FIG. 10, the metal payment card 110 according to an embodiment of the present disclosure includes: a main body 80 formed with an engraved pocket 80a in which an RFID tag 70 can be mounted, the main body being made from at least one of a liquid metal alloy, aluminum alloy and copper alloy and being non-conduction treated; the RFID tag 70 mounted in the engraved pocket 80a; a non-conduction treated metal plate 60 joined to the engraved pocket 80a while covering the RFID tag 70; and an auxiliary body 90 joined at its front surface to a back surface of the main body 80.

In the metal payment card 110 according to an embodiment of the present disclosure, the RFID tag 70 is directly mounted in the engraved pocket and the non-conduction treatment is applied, thus preventing the electromagnetic interference during transmitting and receiving a radio frequency.

Similar to the metal payment card 109 according to an embodiment of the present disclosure shown in FIG. 9, the metal payment card 110 according to an embodiment of the present disclosure shown in FIG. 10 is capable of accomplishing non-contact payment by inputting the card-associated information to the RFID tag.

Figure 11:
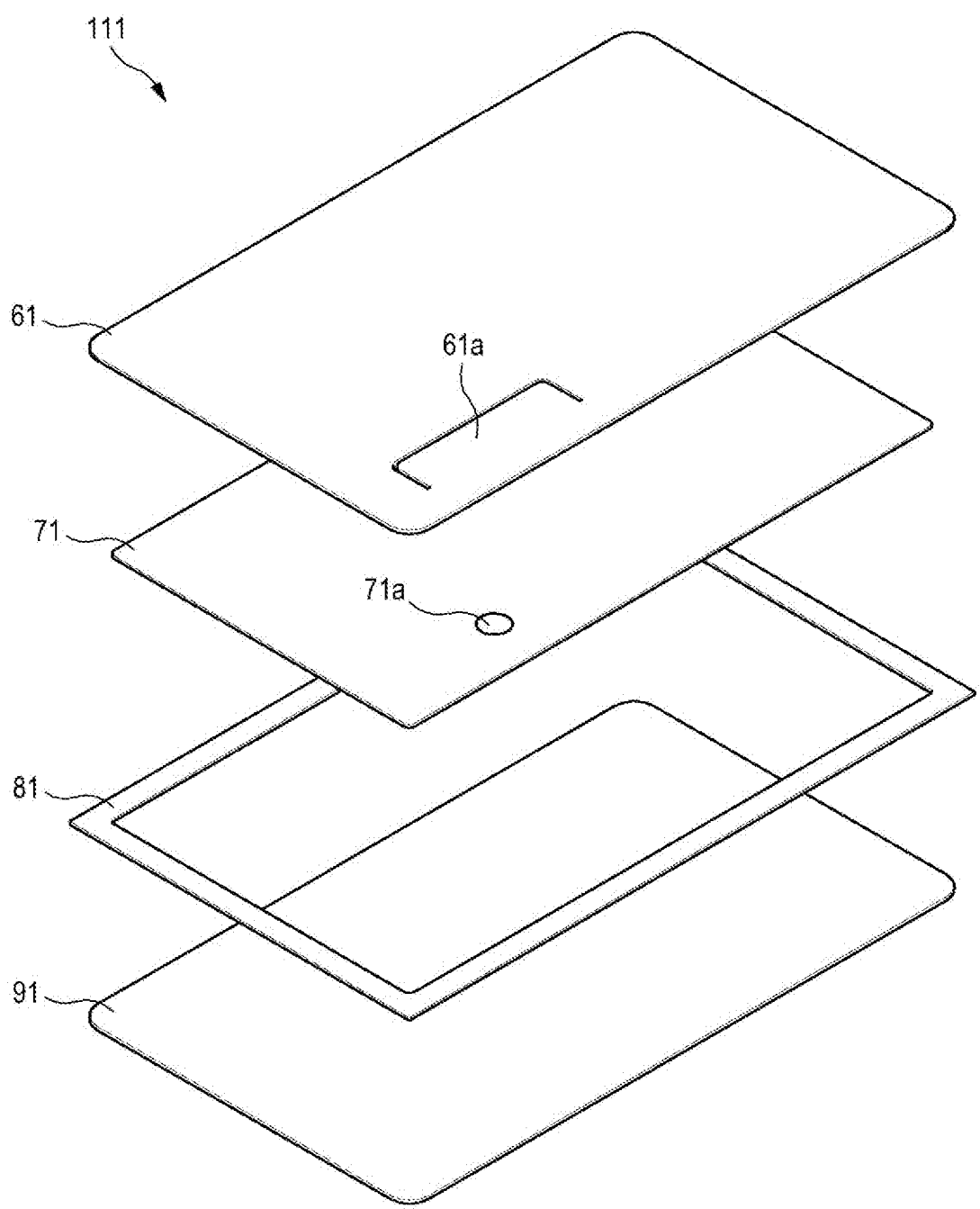
FIG. 11 schematically shows a metal payment card using a metal key pad according to an embodiment of the present disclosure and a method of manufacturing the same.

FIG. 11 schematically shows a metal payment card 111 according to an embodiment of the present disclosure, which uses a metal key pad, and a method of manufacturing the same.

Referring to FIG. 11, the metal payment card 111 according to an embodiment of the present disclosure includes a main body 61 made from at least one of a liquid metal alloy, aluminum alloy and copper alloy. A front surface of the main body 61 is formed with a keypad 61a including one or more buttons. Further, a light emitting diode panel 71 formed with a button dome 71a is joined at its front surface to a back surface of the main body 61. A first auxiliary body 81 and a second auxiliary body 91 are joined to a back surface of the light emitting diode panel 71.

In this embodiment, when a cardholder pushes down the metal keypad 61*a* to obtain necessary information, the button dome 71*a* of the light emitting diode panel 71 (specifically, organic light emitting diode (OLED) panel) is manipulated accordingly, thus optically displaying the card-associated information requested by the cardholder such as a card point information. Further, an additional function such as a card lock function may be accomplished by using the light emitting diode panel 71.

In this embodiment, the metal keypad 61*a* may be manufactured by forming a large number of buttons on a metal plate comprising a thin metallic plate, and then forming an identification mark such as letters, symbols, etc., on the button. A silicon pad having a large number of switching protrusions on its bottom is attached to an underside of the metal plate. When the metal keypad 61*a* is pressed, the metal keypad makes contact with contacts on the light emitting diode panel 71 located below the metal keypad, thereby generating signals. The method of manufacturing the metal keypad 61*a* is not limited to the above-explained example and various methods other than that may be used.

Further, a solar cell or other power supplies may be employed as a power supply for energizing a back light of the light emitting diode panel 71. The energizing power supply includes a disposable power supply or rechargeable power supply. In particular, in case of using an OLED panel as the light emitting diode panel, the light emitting diode panel does not need a back light. Thus, it can be made thinner and is operable under a power supply of 2 V to 10 V.

To protect the light emitting diode panel 71, the auxiliary body may include a first, frame-shaped auxiliary body 81 and a second, panel-shaped auxiliary body 91.

Figure 12A:
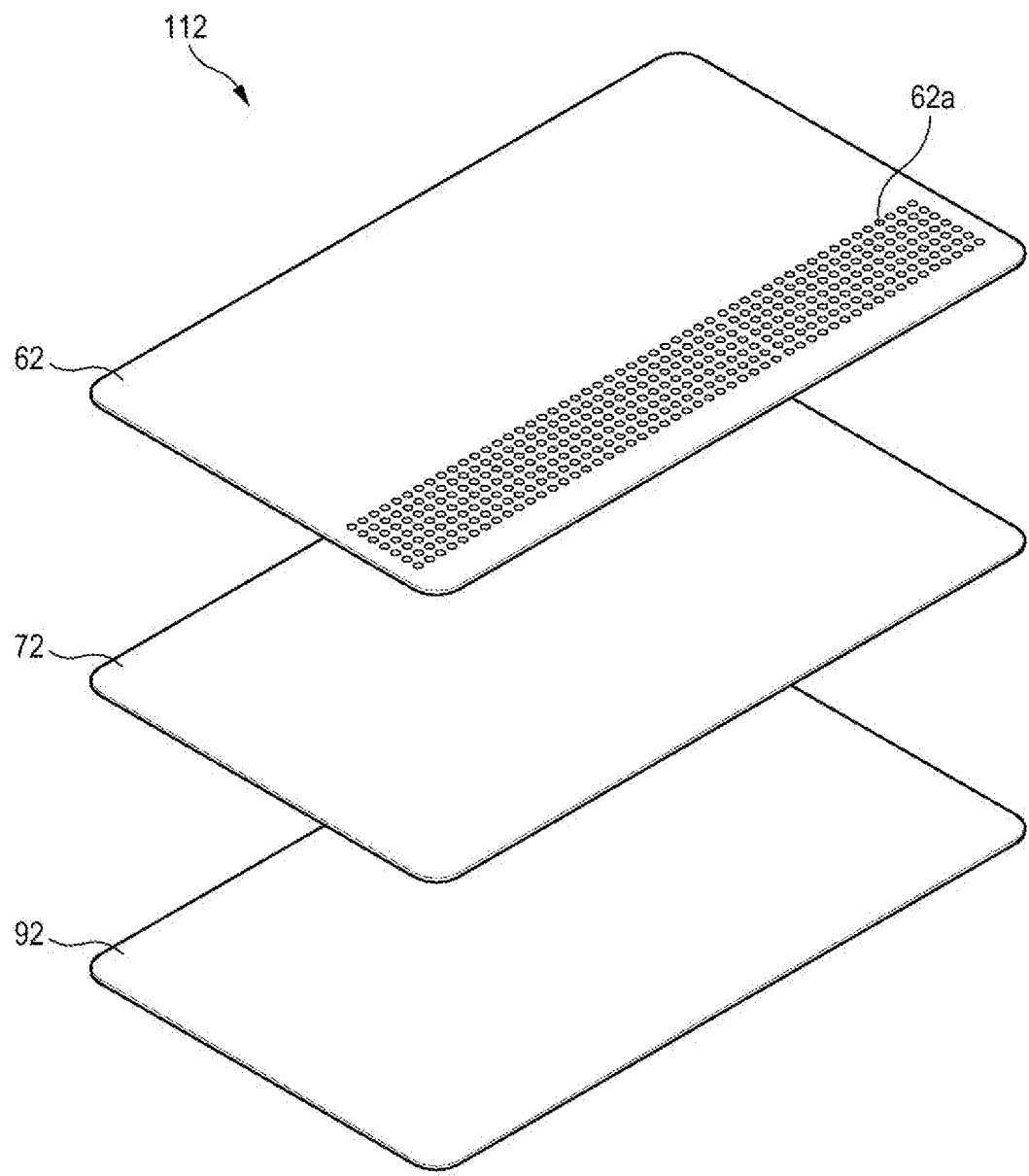
FIGS. 12A and 12B schematically show a metal payment card according to an embodiment of the present disclosure, which uses a light emitting panel and a card hole, and a method of manufacturing the same.
Figure 12B:
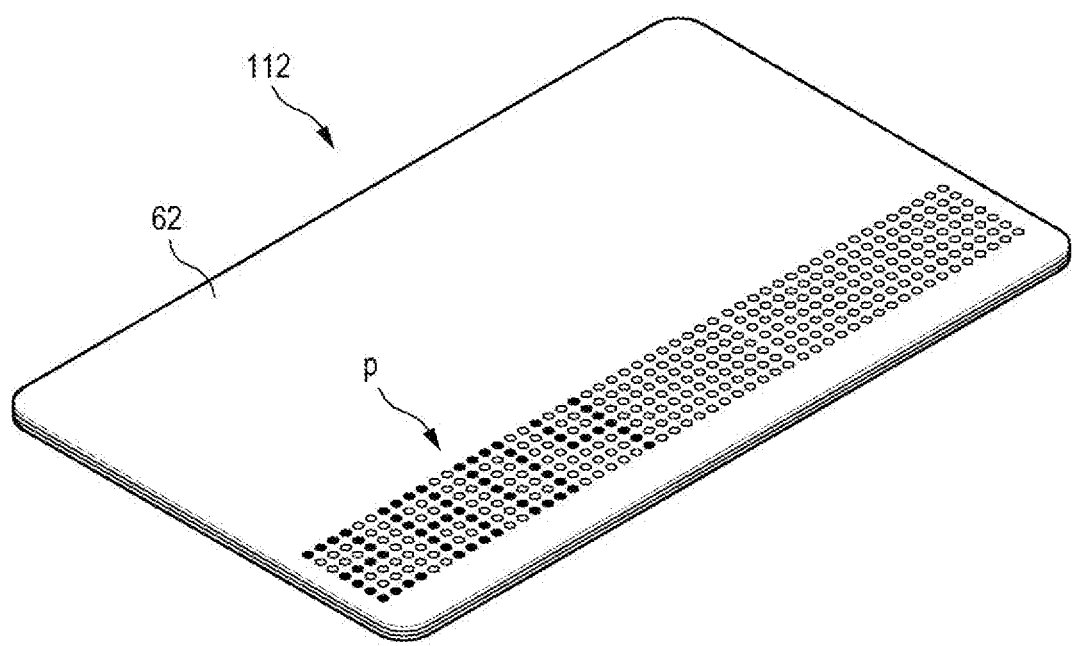

FIGS. 12A and 12B schematically show a metal payment card 112 according to an embodiment of the present disclosure, which uses a light emitting diode panel and card holes, and a method of manufacturing the same.

Referring to FIGS. 12A and 12B, the metal payment card 112 according to an embodiment of the present disclosure includes: a main body 62 made from at least one of a liquid metal alloy, aluminum alloy and copper alloy, a front surface of which is formed with a large number of holes 62*a*; a light emitting diode panel 72 joined at its front surface to a back surface of the main body 62; and an auxiliary body 92 joined to a back surface of the light emitting diode panel 72.

In this embodiment, the large number of fine holes 62*a* may be formed in the main body 62 using a high-speed press. The metal payment card is capable of optically displaying the card-associated information such as the card point information generally indicated by P, by means of the light emitted from the light emitting diode panel 71 (specifically, an organic light emitting diode (OLED) panel).

Descriptions are made as to a metal payment card according to an embodiment of the present disclosure, in which an IC chip is mounted, and a method of manufacturing the same.

An IC chip has a built-in microprocessor and memory. Thus, when the IC chip is mounted in the card, the card may serve as a credit card, a debit card or a transportation card by storing the basic card information and other relevant information in the IC chip.

Figure 13A:
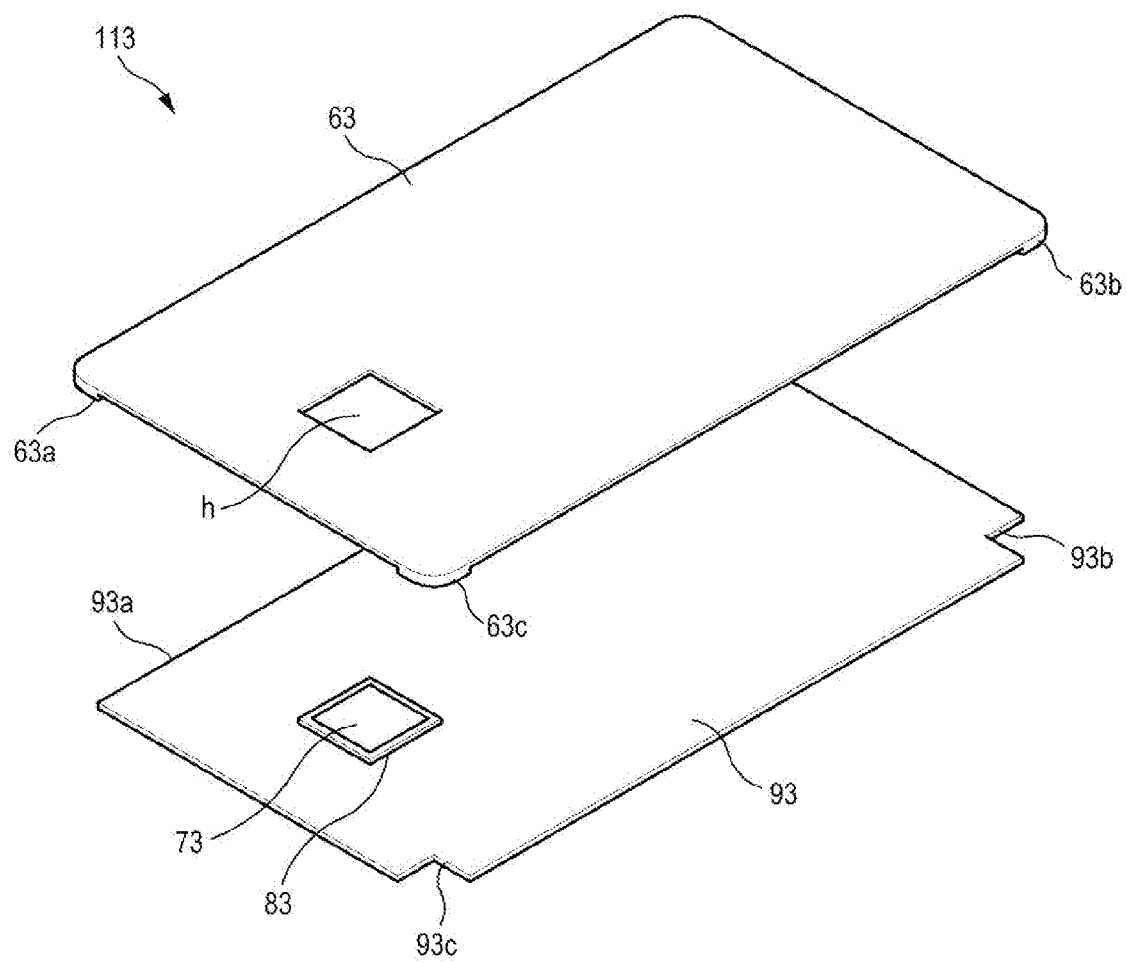
FIGS. 13A and 13B schematically show a metal payment card according to an embodiment of the present disclosure, to which an IC chip is attached, and a method of manufacturing the same.
Figure 13B:
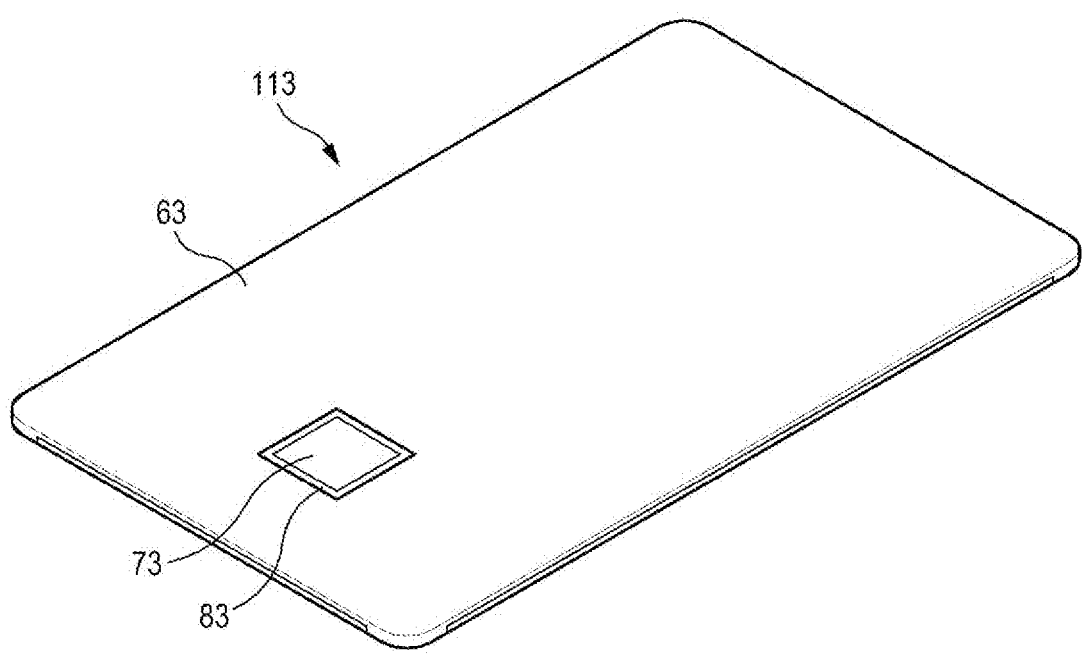

FIGS. 13A and 13B schematically show a metal payment card 113 according to an embodiment of the present disclosure, to which an IC chip is attached, and a method of manufacturing the same.

Referring to FIGS. 13A and 13B, a first auxiliary body 83, in which an IC chip 73 is mounted, is mounted on a second auxiliary body 93. A non-conduction treated main body 63 is formed with a hole h, to which the first auxiliary body 83 is coupled correspondingly such that the IC chip 73 appears outward. Then, the second auxiliary body 93 is joined to the main body 63. FIG. 13B shows the completed metal payment card 113.

Solid high-molecular resin (Poly Tetra Fluor Ethylene (PTFE)), ceramic, etc., may be used as a non-conductive substance for use in a non-conduction treatment. The main body 63 may be non-conduction treated by coating the main body 63 with a non-conductive substance and thus forming a thin non-conductive film. The non-conduction treatment may be performed using various non-conductive substance and methods used in the art other than the above.

In this embodiment, a protrusion guide portions 63*b*, 63*c* are formed at two corners of the main body 63 and an edge wall guide portions 63*a* is formed at one edges of the main body. Thus, the main body includes the guide portions 63*a*, 63*b*, 63*c* shown in FIG. 7A. Further, insertion portions 93*a*, 93*b*, 93*c* engaging the guide potions are formed in the second auxiliary body 93. The above-described configuration is merely an example. It is a matter of course that variously-shaped guide portion and insertion portion may be formed.

Figure 14A:
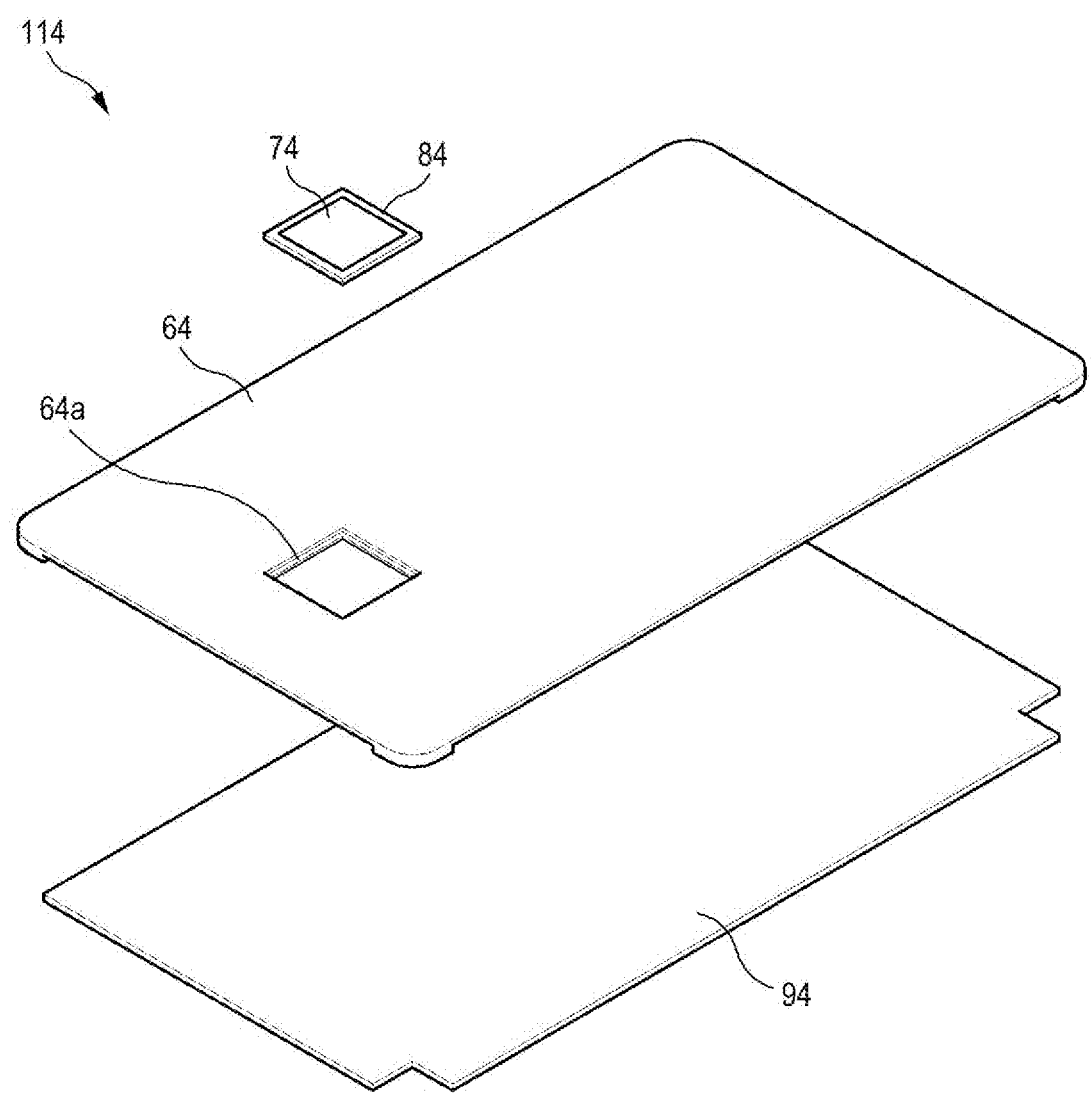
FIGS. 14A and 14B schematically show a metal payment card according to another embodiment of the present disclosure, to which an IC chip is attached, and a method of manufacturing the same.
Figure 14B:
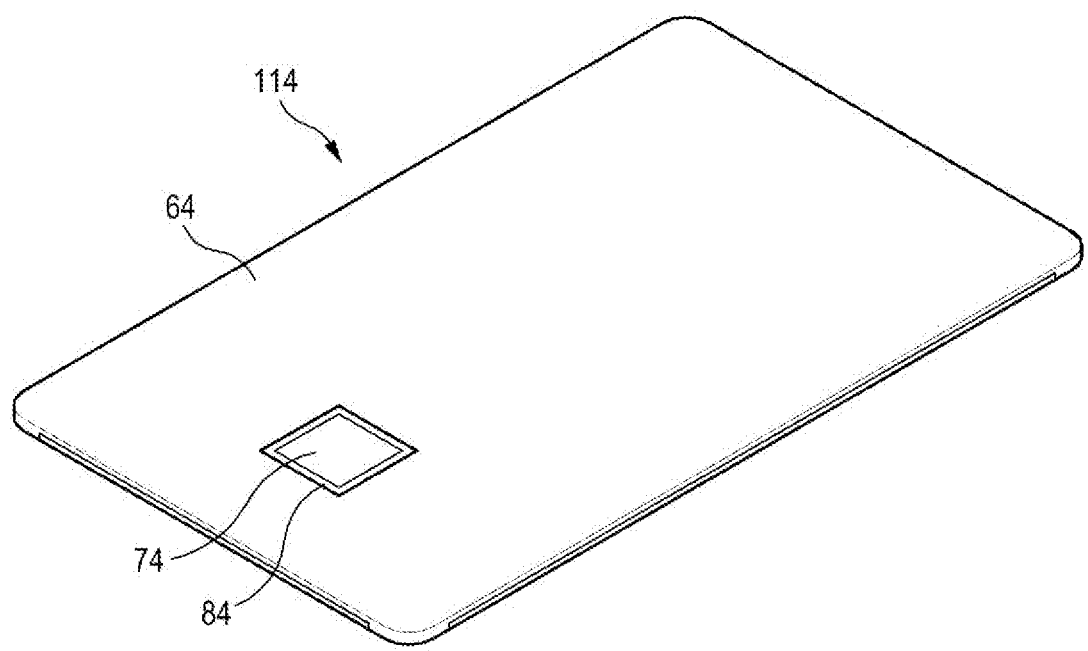

FIGS. 14A and 14B schematically show a metal payment card 114 according to another embodiment of the present disclosure, to which with an IC chip is attached, and a method of manufacturing the same.

Referring to FIGS. 14A and 14B, a first auxiliary body 84, in which an IC chip 74 is mounted, is coupled to a hole 64*a* formed in a main body 64, which is made from at least one of a liquid metal alloy, aluminum alloy and copper alloy. Then, a second auxiliary body 94 is joined to the main body 64. FIG. 14B shows the completed metal payment card 114. Specifically, the first auxiliary body 84 with the IC chip 74 mounted therein and the second auxiliary body 94 located therebelow are fusion-bonded to each other with the main body 64 interposed therebetween, for example, by using an ultrasonic fusion bonding method, thus manufacturing the metal payment card 114. In this embodiment, the main body 64 is non-conduction treated with the above-described non-conductive substance.

Figure 15A:
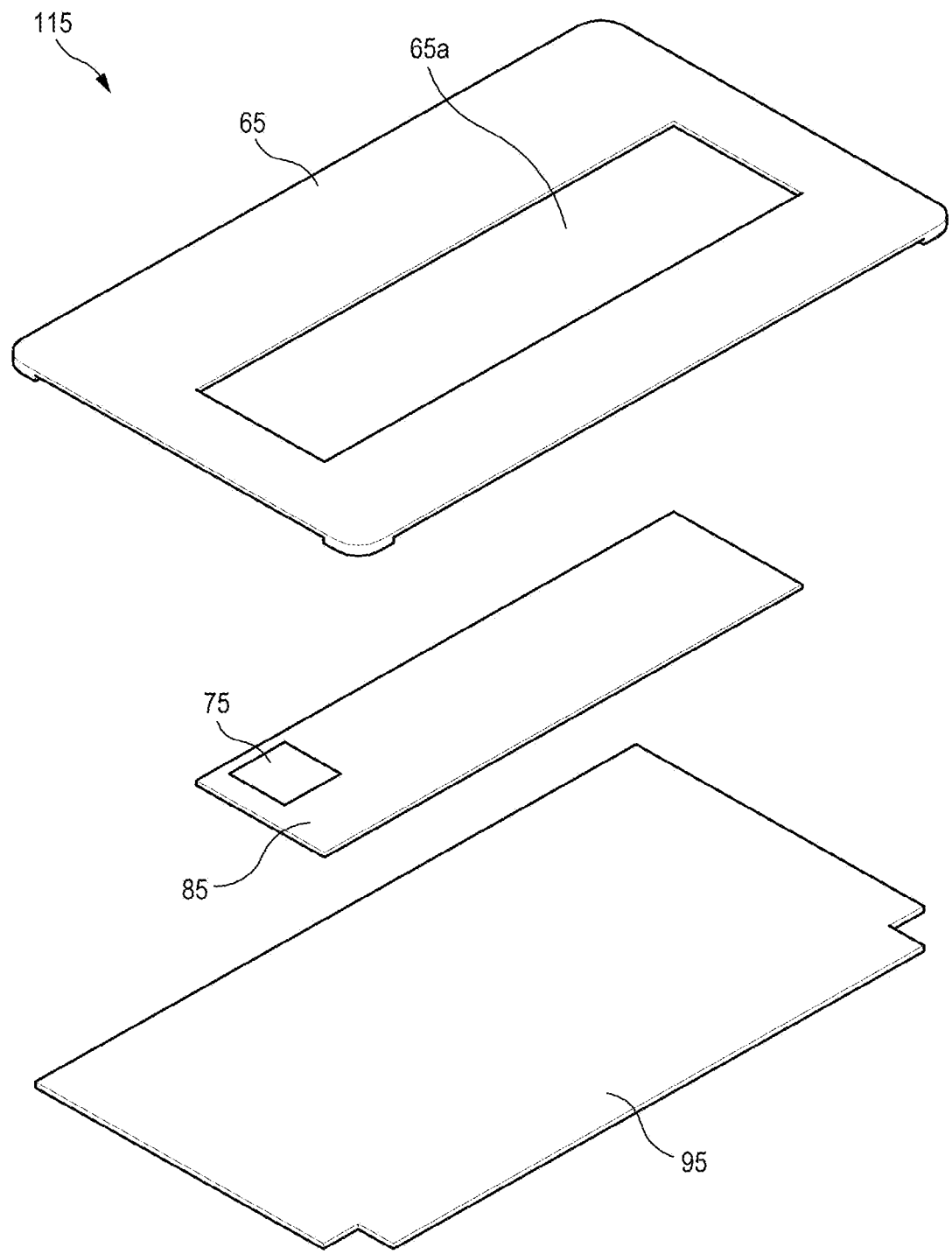
FIGS. 15A and 15B schematically show a metal payment card according to a yet another embodiment of the present disclosure, to which an IC chip is attached, and a method of manufacturing the same.
Figure 15B:
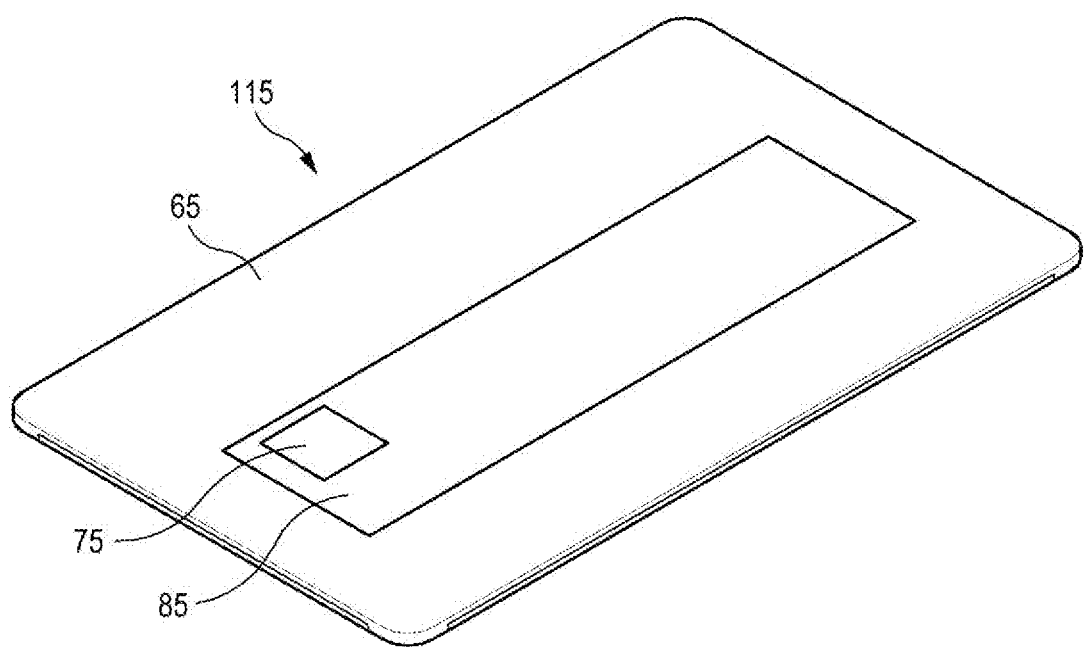

FIGS. 15A and 15B schematically show a metal payment card 115 according to a yet another embodiment of the present disclosure, to which an IC chip is attached, and a method of manufacturing the same.

Referring to FIGS. 15A and 15B, a first, rectangular auxiliary body 85, in which an IC chip 75 is mounted, is coupled to a hole 65*a* formed in a main body 65, which is made from at least one of a liquid metal alloy, aluminum alloy and copper alloy. Then, a second auxiliary body 95 is joined to the main body 65. FIG. 15B shows the completed metal payment card 115. Specifically, the main body 65 and the second auxiliary body 95 are joined to each other as the first auxiliary body 85 having the IC chip 75 is interposed therebetween, by using fusion-bonding, e.g., an ultrasonic fusion bonding method, thus manufacturing the metal payment card 115. In this embodiment, the main body 65 is non-conduction treated as described above.

Figure 16A:
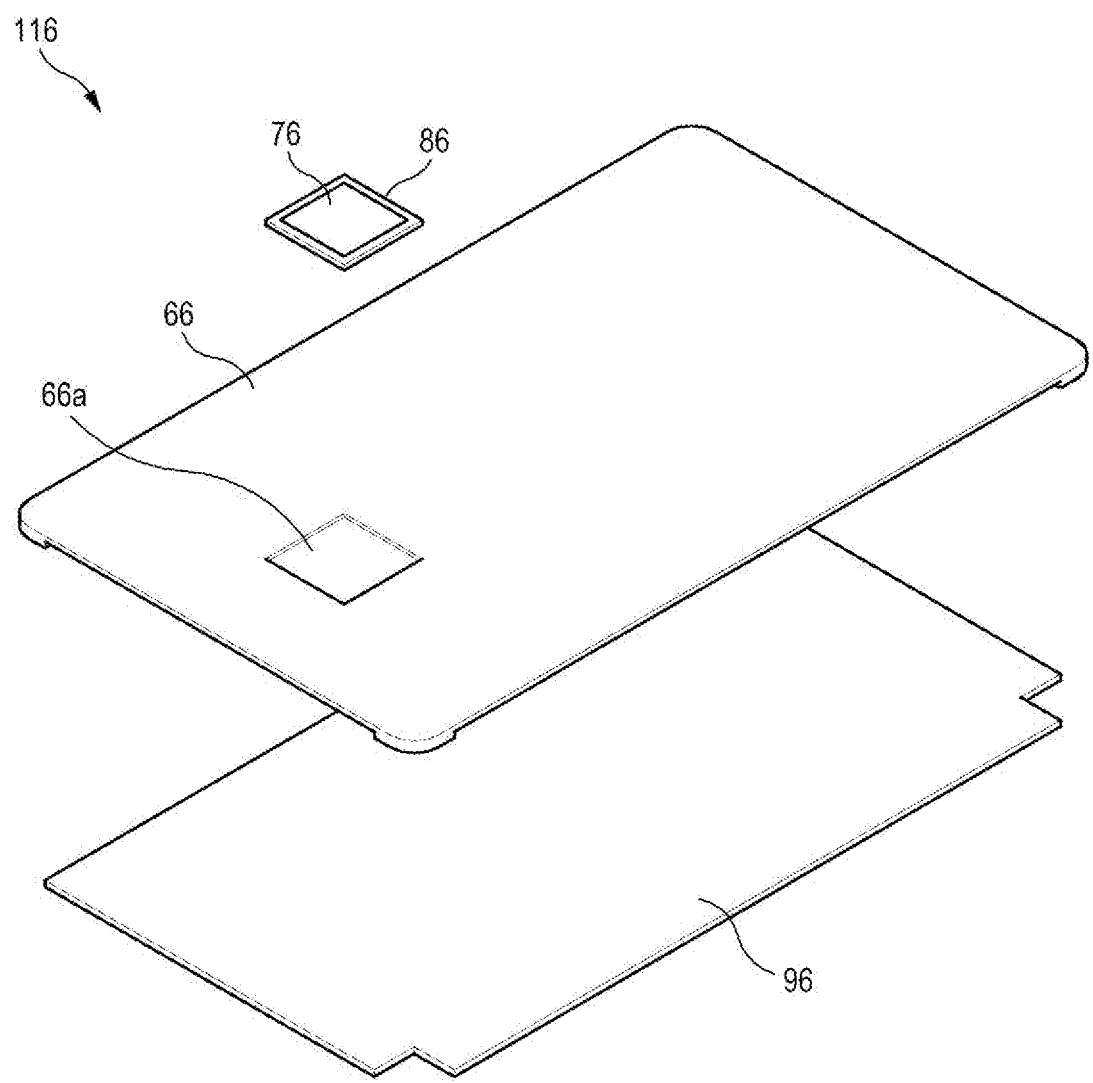
FIGS. 16A and 16B schematically show a metal payment card according to a still another embodiment of the present disclosure, to which an IC chip is attached, and a method of manufacturing the same.
Figure 16B:
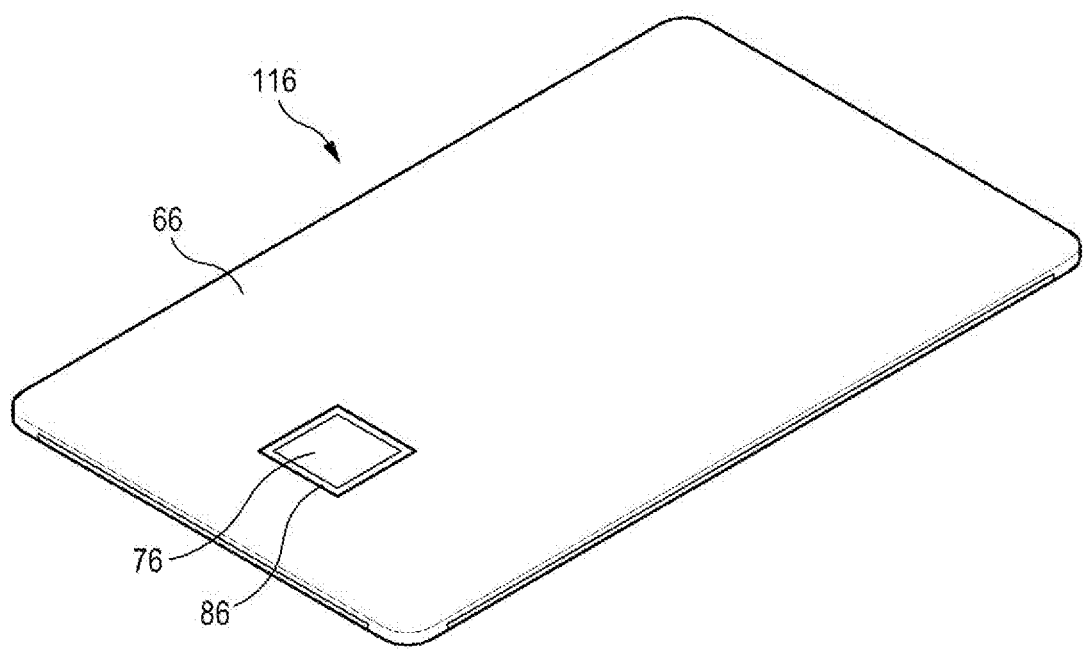

FIGS. 16A and 16B schematically show a metal payment card 116 according to a still another embodiment of the present disclosure, to which an IC chip is attached, and a method of manufacturing the same.

Referring to FIGS. 16A and 16B, a first, rectangular auxiliary body 86, in which an IC chip 76 is mounted, is mounted on an engraved pocket 66*a* formed in a main body 65. Then, the main body 66 and a second auxiliary body 96 are joined to each other. FIG. 16B shows the completed metal payment card 116. In this embodiment, the main body 66 is non-conduction treated as described above.

Figure 17:
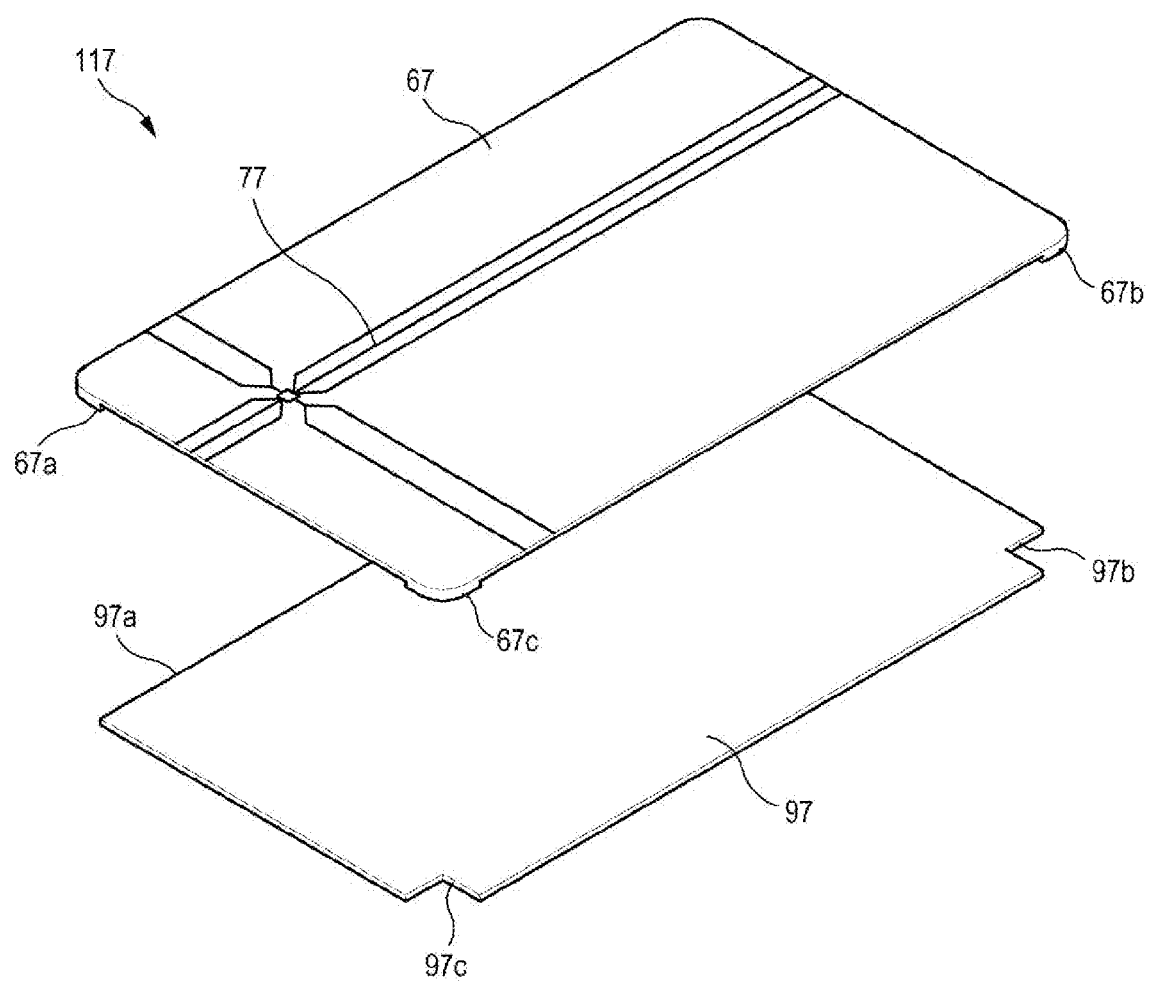
FIG. 17 schematically shows a metal payment card according to an embodiment of the present disclosure, wherein a metallic section of an IC chip is enlarged and thus a front surface of a card is formed with an IC chip metal, and a method of manufacturing the same.

FIG. 17 schematically shows a metal payment card 117 according to an embodiment of the present disclosure, wherein a metallic section of an IC chip is enlarged and thus a front surface of a card is formed with an IC chip metal, and a method of manufacturing the same.

Referring to FIG. 17, the metal payment card 117 according to an embodiment of the present disclosure includes: a main body 67 including guide portions 67a, 67b, 67c comprising a protrusion and an edge wall; and an auxiliary body 97 joined at its front surface to a back surface of the main body 67. A front surface of the main body 67 is formed with an IC chip metal 77. Insertion portions 97a, 97b, 97c, which correspondingly engage the guide portions 67a, 67b, 67c, are formed in the auxiliary body 97, thus achieving firm engagement between the main body 67 and the auxiliary body 97. This embodiment includes the front surface of the card formed with the IC chip metal. Thus, the metal payment card 117, which is capable of serving as a transportation card or a cash card, can be manufactured.

FIG. 18 is a flow chart showing in detail a method of manufacturing a metal payment card according to an embodiment of the present disclosure, which uses injection molding.

Referring to FIG. 18, first at Step S10, at least one of a molten liquid metal alloy, molten aluminum alloy and molten copper alloy is injected into a molding space defined between a first mold and a second mold in a state where the first and second molds are joined to each other. The first mold and the second mold are formed with the pattern region of the metal payment card in advance, thus integrally injection molding the pattern region together with the main body of the metal payment card. Optionally, the guide portions may be injection molded together with the main body and the pattern region by making a mold in advance.

Subsequently, at Step S20, if the main body is injection molded in the molding space of the above-described injection molding apparatus, then the injection-molded main body is separated from the first and second molds and then a grinding process for finishing surfaces and corners of the main body is performed.

Next, a washing process is performed on the main body, on which the grinding process has been performed, in order to rid the main body of foreign substances such as dust (Step S30).

Subsequently, a vapor deposition process or electro deposition process is performed on the main body, on which the washing process has been performed, in order to apply a certain color (e.g., black) to the main body (Step S40). In this step, a vapor deposition film may be formed by Teflon coating or vacuum ion coating.

The Teflon coating uses Teflon (fluoroplastics) as a paint. The Teflon coating is a fluoroplastics coating having unique properties of Teflon such as non-adhesiveness, heat resistance, chemical resistance, wear resistance, electric insulation, etc. The vacuum ion coating is a surface technology capable of forming a strong thin film on the main body 10 at a temperature of 500 degrees C. or less. The vacuum ion coating is a surface technology wherein coating substances are evaporated and evaporated ions react with various gases to thus form a thin film. The vacuum ion coating exhibits high hardness and has excellent wear resistance, adhesion, lubricity, elasticity, etc. The electro deposit process uses a painting method of immersing the main body to black paint, wherein the paint and the main body are charged with static electricity of different polarity.

Next, at Step S50, a coating process is performed for coating the surface of the main body, on which the vapor deposit process or the electro deposit process has been performed, in order to apply an anti-fingerprint treatment, a durability treatment and a finish treatment to the surface of the main body. The coating process may be performed by paint-film coating or thin-film coating. The paint-film coating is performed by applying a coating film to an object using latex or a film coating agent. The paint-film coating can form a thick coating film. The thin-film coating is performed by spraying a super-particle latex coating agent to an object, thereby forming a coating film. The thin-film coating forms a relatively thin coating film, but does not affect the adjacent coating regions.

At Step S60, a first recognition region including the card-associated information is formed on the front surface of the main body, on which the coating process has been performed, using one of engraving, laser marking and printing.

Subsequently, the insertion portions of the auxiliary body are fitted to the guide portions located in the back surface of the main body, in which the first recognition region is formed, and then the main body and the auxiliary body are bonded to each other using heat, pressure or a bond (Step S70).

Next, at Step S80, a second recognition region including the card-associated information is formed on the back surface of the auxiliary body using one of engraving, laser marking and printing.

Finally, at Step S90, a magnetic stripe or an IC chip, which stores a basic information of the metal payment card, is adhered to the back surface of the auxiliary body and then the basic information (a card number, expiration date, membership number, individual customer information, etc.) of the payment card is inputted to the magnetic stripe or the IC chip through an input device provided separately. Then, the payment card is issued to a cardholder.

While the present disclosure has been described by way of the limited embodiments and the drawings, the present disclosure should not be limited to the foregoing embodiments. Various alternations and modifications may be made from the present disclosure by those of ordinary skill in the art. Accordingly, the scope of the present disclosure must be understood from the following claims and all equal or equivalent modifications are intended to fall within the scope of the present disclosure.

The metal payment card and the method of manufacturing the same according to the present disclosure provide a metal payment card that has enhanced durability and is capable of minimizing the damage resulting from external circumstances.

What is claimed is:

1. A metal payment card comprising:
   a main body made from at least one of a liquid metal alloy, an aluminum alloy or a copper alloy, the main body including a tangible pattern region made from at least one of a liquid metal alloy, an aluminum alloy or a copper alloy;
   an auxiliary body joined at a front surface thereof to a back surface of the main body;
   a guide portion formed at an edge of the back surface of the main body; and
   an insertion portion formed at an edge of the auxiliary body and correspondingly inserted to the guide portion of the main body,
   wherein the main body and the pattern region are integrally formed by injection molding and the guide portion of the main body is integrally formed together with the main body by injection molding.

2. The metal payment card of claim 1,
   wherein the guide portion of the main body comprises a protrusion embossed in at least one corner of the back surface of the main body or an edge wall embossed in at least one edge of the back surface of the main body, and wherein the insertion portion of the auxiliary body is engraved so as to be correspondingly inserted to the protrusion or the edge wall.

3. The metal payment card of claim 1,
wherein the back surface of the main body is further formed with an embossed or engraved pattern region, and
wherein the auxiliary body is formed with an embossed or engraved pattern region corresponding to the pattern region of the back surface of the main body.

4. The metal payment card of claim 1, further comprising:
an electrical shield joined at a front surface thereof to the back surface of the main body; and
an RFID tag mounted on a back surface of the electrical shield,
wherein the auxiliary body is joined at the front surface thereof to a back surface of the RFID tag.

5. The metal payment card of claim 1, wherein the main body is non-conduction treated and is formed with an engraved pocket in which an RFID tag is mounted,
wherein the metal payment card further comprises
a non-conduction treated metal plate joined to the engraved pocket as covering the RFID tag.

6. The metal payment card of claim 1, wherein a keypad including one or more buttons is formed in a front surface of the main body,
wherein the metal payment card further comprises
a light emitting diode panel joined at a front surface thereof to the back surface of the main body, the light emitting diode panel being formed with a button dome,
wherein the auxiliary body is joined to a back surface of the light emitting diode panel.

7. The metal payment card of claim 1, wherein a large number of holes are formed in a front surface of the main body,
wherein the metal payment card further comprises
a light emitting diode panel joined at a front surface thereof to the back surface of the main body,
wherein the auxiliary body is joined to a back surface of the light emitting diode panel.

8. The metal payment card of claim 1, wherein the main body is non-conduction treated and is formed with a hole,
wherein the auxiliary body comprises:
a first auxiliary body in which an IC chip is mounted; and
a second auxiliary body,
wherein the first auxiliary body is mounted on a front surface of the second auxiliary body and the second auxiliary body is joined at a front surface thereof to the back surface of the main body such that the first auxiliary body is correspondingly joined to the hole.

9. The metal payment card of claim 1, wherein the main body is non-conduction treated and is formed with a hole,
wherein the auxiliary body comprises:
a first auxiliary body in which an IC chip is mounted, the first auxiliary body being correspondingly joined to the hole formed in the main body; and
a second auxiliary body joined at a front surface thereof to back surfaces of the main body and the first auxiliary body.

10. The metal payment card of claim 1, wherein the main body comprises an IC chip panel.

11. A method of manufacturing a metal payment card, comprising:
forming a main body from at least one of a liquid metal alloy, an aluminum alloy or a copper alloy;
providing a tangible pattern region in the main body, the tangible pattern region being made from at least one of a liquid metal alloy, an aluminum alloy or a copper alloy;
forming a guide portion at an edge of a back surface of the main body integrally together with the main body by injection molding;
providing an auxiliary body and forming an insertion portion at an edge of the auxiliary body, the insertion portion being correspondingly inserted to the guide portion of the main body; and
joining a front surface of the auxiliary body to a back surface of the main body,
wherein the main body and the pattern region are integrally formed by injection molding or a sheet having the pattern region is processed separately and is then attached to the main body.

12. The method of claim 11, wherein forming the guide portion comprises embossing a protrusion in at least one corner of the back surface of the main body or forming an edge wall at at least one edge of the back surface of the main body, and
wherein forming the insertion portion comprises engraving the insertion portion at an edge of the auxiliary body so as to be correspondingly inserted to the protrusion or the edge wall of the guide portion of the main body.

13. The method of claim 11, further comprising:
embossing or engraving a pattern region at the back surface of the main body; and
embossing or engraving a pattern region corresponding to the pattern region of the back surface of the main body at the auxiliary body.

14. The method of claim 11, further comprising:
joining a front surface of an electrical shield to the back surface of the main body;
mounting an RFID tag on a back surface of the electrical shield; and
joining the auxiliary body to a back surface of the RFID tag.

15. The method of claim 11, further comprising:
non-conduction treating the main body and forming an engraved pocket in the main body;
mounting an RFID tag in the engraved pocket; and
providing a metal plate and non-conduction treating the metal plate and joining the metal plate to the engraved pocket so as to cover the RFID tag.

16. The method of claim 11, further comprising:
forming a keypad including one or more buttons in a front surface of the main body;
joining a front surface of a light emitting diode panel to the back surface of the main body, the light emitting diode panel being formed with a button dome; and
joining the auxiliary body to a back surface of the light emitting diode panel.

17. The method of claim 11, further comprising:
forming a large number of holes in a front surface of the main body;
joining a front surface of a light emitting diode panel to the back surface of the main body; and
joining the auxiliary body to a back surface of the light emitting diode panel.

18. The method of claim 11, further comprising non-conduction treating the main body and forming a hole in the main body,
wherein providing the auxiliary body comprises:
providing a first auxiliary body in which an IC chip is mounted; and mounting the first auxiliary body on a front surface of a second auxiliary body and then joining the front surface of the second auxiliary body to the back surface of the main body so as to correspond to the hole formed in the main body.

19. The method of claim 11, further comprising non-conduction treating the main body and forming a hole in the main body,
wherein providing the auxiliary body comprises:
mounting an IC chip on a first auxiliary body and joining the first auxiliary body to the main body so as to correspond to the hole formed in the main body; and
joining a front surface of a second auxiliary body to back surfaces of the main body and the first auxiliary body.

20. The method of claim 11, further comprising:
forming the main body comprising an IC chip panel.

21. A metal payment card comprising:
a main body made from at least one of a liquid metal alloy, an aluminum alloy or a copper alloy, the main body including a tangible pattern region made from at least one of a liquid metal alloy, an aluminum alloy or a copper alloy;
an auxiliary body joined at a front surface thereof to a back surface of the main body;
a guide portion formed at an edge of the back surface of the main body; and
an insertion portion formed at an edge of the auxiliary body and correspondingly inserted to the guide portion of the main body,
wherein the guide portion of the main body is integrally formed together with the main body by injection molding, and
wherein a sheet having the pattern region is processed separately and is attached to the main body.

22. The metal payment card of claim 21, wherein the sheet is laser welded or metal bonded to a front surface of the main body.

* * * * *